US008223642B2

(12) United States Patent
Curry et al.

(10) Patent No.: US 8,223,642 B2
(45) Date of Patent: Jul. 17, 2012

(54) DIFFERENTIATED SERVICES USING WEIGHTED QUALITY OF SERVICE (QOS)

(75) Inventors: David S. Curry, San Jose, CA (US); Robert J. Colvin, San Jose, CA (US); Samer I. Nubani, Santa Clara, CA (US); Ravindra Sunkad, Pleasanton, CA (US); Man-Tung T. Hsiao, Cupertino, CA (US); Paul M. Hallinan, San Carlos, CA (US); Rishi Mehta, San Jose, CA (US); Sanjay Khanna, Fremont, CA (US)

(73) Assignee: Tellabs San Jose, Inc., San Jose, CA (US)

( * ) Notice: Subject to any disclaimer, the term of this patent is extended or adjusted under 35 U.S.C. 154(b) by 689 days.

(21) Appl. No.: 11/413,409

(22) Filed: Apr. 28, 2006

(65) Prior Publication Data

US 2007/0253438 A1 Nov. 1, 2007

(51) Int. Cl.
*H04L 12/56* (2006.01)
(52) U.S. Cl. ............ 370/235; 370/395.4; 370/412; 709/234
(58) Field of Classification Search .......... None
See application file for complete search history.

(56) References Cited

U.S. PATENT DOCUMENTS

| | | | |
|---|---|---|---|
| 5,640,389 A | 6/1997 | Masaki et al. | 370/418 |
| 6,320,845 B1 * | 11/2001 | Davie | 370/230 |
| 6,590,885 B1 * | 7/2003 | Jorgensen | 370/338 |
| 6,608,816 B1 * | 8/2003 | Nichols | 370/235 |
| 6,654,343 B1 * | 11/2003 | Brandis et al. | 370/229 |
| 7,161,904 B2 * | 1/2007 | Hussain et al. | 370/230 |
| 7,236,491 B2 * | 6/2007 | Tsao et al. | 370/392 |
| 7,245,946 B2 * | 7/2007 | Liu | 455/574 |
| 7,621,162 B2 * | 11/2009 | Bartky | 70/388 |
| 2002/0131413 A1 * | 9/2002 | Tsao et al. | 370/392 |
| 2002/0191622 A1 * | 12/2002 | Zdan | 370/401 |
| 2002/0194362 A1 * | 12/2002 | Rawlins et al. | 709/235 |
| 2002/0196785 A1 | 12/2002 | Connor | 370/392 |
| 2003/0031131 A1 | 2/2003 | Bottiglieri et al. | 370/235 |
| 2003/0128667 A1 | 7/2003 | Matsufuru | 370/230.1 |
| 2003/0214948 A1 * | 11/2003 | Jin et al. | 370/392 |
| 2004/0001491 A1 | 1/2004 | Ruutu et al. | 370/395.4 |
| 2005/0074011 A1 * | 4/2005 | Robotham et al. | 370/395.4 |
| 2005/0135378 A1 * | 6/2005 | Rabie et al. | 370/395.21 |
| 2005/0175014 A1 * | 8/2005 | Patrick | 370/395.43 |
| 2005/0286524 A1 * | 12/2005 | Bennett | 370/389 |

OTHER PUBLICATIONS

Jiwasurat et al., *Hierarchical Shaped Deficit Round-Robin Scheduling*, IEEE Globecom 2005, pp. 688-693, Nov. 28, 2005.

* cited by examiner

*Primary Examiner* — Brian Roberts
(74) *Attorney, Agent, or Firm* — Fitzpatrick, Cella Harper & Scinto

(57) ABSTRACT

Differentiated services for network traffic using weighted quality of service is provided. Network traffic is queued into separate per flow queues, and traffic is scheduled from the per flow queues into a group queue. Congestion management is performed on traffic in the group queue. Traffic is marked with priority values, and congestion management is performed based on the priority values. For example, traffic can be marked as "in contract" if it is within a contractual limit, and marked as "out of contract" if it is not within the contractual limit. Marking can also include classifying incoming traffic based on Differentiated Service Code Point. Higher priority traffic can be scheduled from the per flow queues in a strict priority over lower priority traffic. The lower priority traffic can be scheduled in a round robin manner.

14 Claims, 21 Drawing Sheets

DIFFERENTIATED SERVICES USING WEIGHTED QUALITY OF SERVICE (QOS)

BACKGROUND OF THE INVENTION

1. Field of the Invention

This invention pertains to devices, methods, and computer programs providing differentiated services for network traffic. Specifically, the invention relates to a system in which differentiated services are provided using a combination of traffic flow weighting, group queues, and congestion management.

2. Description of Related Art

Network service providers offer differentiated services in order to tailor customer bandwidth demands based on priority levels of a customer's network traffic. In particular, higher priority traffic is generally given preference over lower priority traffic, thus increasing bandwidth and reducing delay for higher priority traffic at the expense of the lower priority traffic. However, many traditional differentiated services methods do not properly balance high priority and low priority traffic. As a result, lower priority traffic sometimes can be prematurely discarded in conditions of network congestion.

SUMMARY OF THE INVENTION

To address the foregoing, the present invention provides a method, apparatus, and computer program for providing differentiated services for network traffic. In one embodiment, the traffic is queued into a first plurality of separate per flow queues, and the traffic is scheduled from the per flow queues into a group queue. Congestion management is performed on traffic in the group queue.

In at least one embodiment of the present invention, traffic is marked with priority values according to priority, and congestion management is performed based on the priority values. For example, the marking can include determining whether the traffic is within a contractual limit, and marking the traffic as "in contract" if the traffic is within the contractual limit, and marking the traffic as "out of contract" if the traffic is not within the contractual limit. In another example, the marking can include classifying incoming traffic based on Differentiated Service Code Point.

According to one embodiment of the present invention, congestion management is performed in a per flow queue.

In another embodiment of the present invention, the traffic is scheduled from the per flow queues by scheduling higher priority traffic in a strict priority over lower priority traffic. For example, the lower priority traffic can include a first lower priority traffic and a second lower priority traffic. In this case, traffic is scheduled from the per flow queues by scheduling the first lower priority traffic and the second lower priority traffic based on a round robin process.

The traffic can include a plurality of types of traffic including user control traffic, expedited forwarding traffic, assured forwarding traffic, and best effort traffic, and the traffic can be queued into the per flow queues according to traffic type.

In another embodiment, traffic from the group queue is scheduled into a second plurality of separate per flow queues based on priority, and traffic from the second plurality of separate per flow queues is scheduled into either of a high priority group queue or a low priority group queue. In this case, traffic in higher priority per flow queues of the second plurality of separate per flow queues is scheduled into the high priority group queue, and traffic in lower priority per flow queues of the second plurality of per flow queues is scheduled into the low priority group queue.

In another aspect of the present invention, traffic in the higher priority per flow queues of the second plurality of separate per flow queues is scheduled into the high priority group queue based on a round robin process, and traffic in the lower priority per flow queues of the second plurality of separate per flow queues is scheduled into the low priority group queue based on a round robin process.

In a further aspect, traffic can also be scheduled from the high priority group queue in a strict priority over traffic in the low priority group queue.

In another embodiment of the present invention, the network traffic is queued into a first plurality of separate per flow queues, and the traffic is scheduled from the first plurality of per flow queues into either of a high priority group queue or a low priority group queue. Traffic in higher priority per flow queues of the first plurality of separate per flow queues is scheduled into the high priority group queue, and traffic in lower priority per flow queues of the first plurality of separate per flow queues is scheduled into the low priority group queue. Congestion management is performed on traffic in the high priority group queue and traffic in the low priority group queue.

In another aspect of the present invention, traffic in the higher priority per flow queues of the first plurality of separate per flow queues is scheduled into the high priority group queue based on a round robin process, and traffic in the lower priority per flow queues of the first plurality of separate per flow queues is scheduled into the low priority group queue based on a round robin process.

In a further aspect, traffic is scheduled from the high priority group queue and the low priority group queue onto a second plurality of separate per flow queues based on priority, and traffic is scheduled from the per flow queues of the second plurality of separate per flow queues onto either of a second high priority group queue or a second low priority group queue. In this case, traffic in higher priority per flow queues of the second plurality of separate per flow queues is scheduled onto the second higher priority group queue, and traffic in lower priority per flow queues of the second plurality of separate per flow queues is scheduled onto the second low priority group queue.

In another aspect, traffic in the higher priority per flow queues of the second plurality of separate per flow queues is scheduled onto the second high priority group queue based on a round robin process, and traffic in the lower priority per flow queues of the second plurality of separate per flow queues is scheduled onto the second low priority group queue based on a round robin process. Traffic from the second high priority group queue can be scheduled in a strict priority over traffic in the second low priority group queue.

The invention can be embodied in, without limitation, a method, apparatus, or computer-executable program instructions.

This brief summary has been provided so that the nature of the invention may be understood quickly. A more complete understanding of the invention can be obtained by reference to the following detailed description in connection with the attached drawings.

BRIEF DESCRIPTION OF THE DRAWINGS

The present invention will be more readily understood from a detailed description of the preferred embodiments taken in conjunction with the following figures.

DETAILED DESCRIPTION OF THE PREFERRED EMBODIMENTS

Preferred embodiments of the present invention are described below with reference to the accompanying drawings. The embodiments include an apparatus, system, method, and computer program providing differentiated services for network traffic using a combination of traffic flow weighting, group queues, and congestion management.

As one example of a use of the present invention, a network service provider could offer differentiated services enabled by the present invention to its customers. In particular, customers contract with the network provider via a service level agreement (SLA) to receive a particular type and level of service for the customer's network traffic. In one exemplary environment of the present invention, described below in reference to FIG. 1, the network provider operates a network, or "cloud," of network traffic routers. The customer sends network traffic through the provider's network to various network destinations. The network provider services the customer's traffic utilizing embodiments of the present invention to achieve the terms of the SLA.

In particular, differentiated services are provided to the customer. That is, the customer's network traffic is differentiated based on levels of priority. Different levels of weighting, which can be customizable by the customer, can then be applied to the differentiated traffic. In addition, the use of group queues and congestion management allow balanced service of the customer's network traffic. In contrast with conventional methods of differentiated services, which can sometimes discard lower priority traffic prematurely, the present invention allows lower priority traffic to compete more fairly with higher priority traffic. Other advantages of the present invention will become apparent in the description of the preferred embodiments below.

Figure 1:
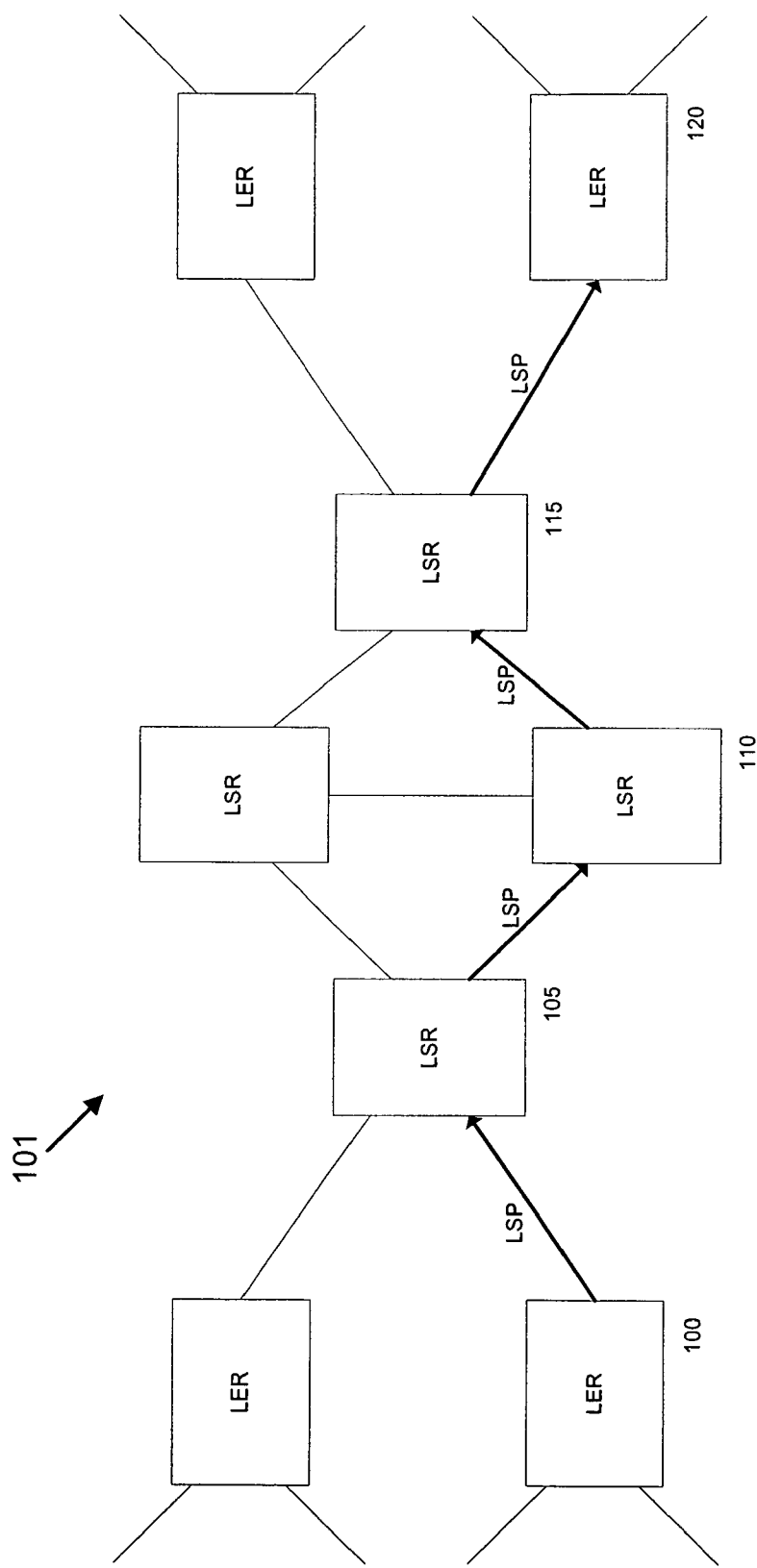
FIG. 1 is a block diagram of an exemplary environment in which an embodiment of the present invention can be implemented.

FIG. 1 depicts one example of an environment in which the present invention can be implemented, which is a multiprotocol label switching (MPLS) network 101. However, one skilled in the art will understand that the present invention can be utilized in other types of networks as well. FIG. 1 shows label edge routers (LERs), including LER 100 and LER 120, and label switching routers (LSRs), including LSRs 105, 110, and 115. Network traffic entering LER 110, for example, is assigned a label switched path (LSP), which defines a path (or partial path) for the traffic through the network. For example, in the illustrated embodiment, an LSP is shown as traversing LER 100 to LSR 105 to LSR 110 to LSR 115 to LER 120. For this LSP, LER 100 is an ingress (originating) node for traffic, while LSRs 105, 110, and 115 are transit nodes, and LER 120 is an egress (terminating) node. In other words, when a customer's network traffic enters LER 100, which is serving as an ingress (originating) node, an LSP is defined to allow the traffic to reach its destination. Preferred embodiments of the present invention, described below, are implemented in the provider's LERs and LSRs to allow the customer's network traffic to traverse the LSP.

The LERs and LSRs depicted in FIG. 1 can be implemented as data processing systems, and the present invention can be implemented as computer-executable program instructions stored on a computer-readable medium of the data processing systems. In other embodiments, software modules or circuitry can be used to implement the present invention.

Figure 2A:
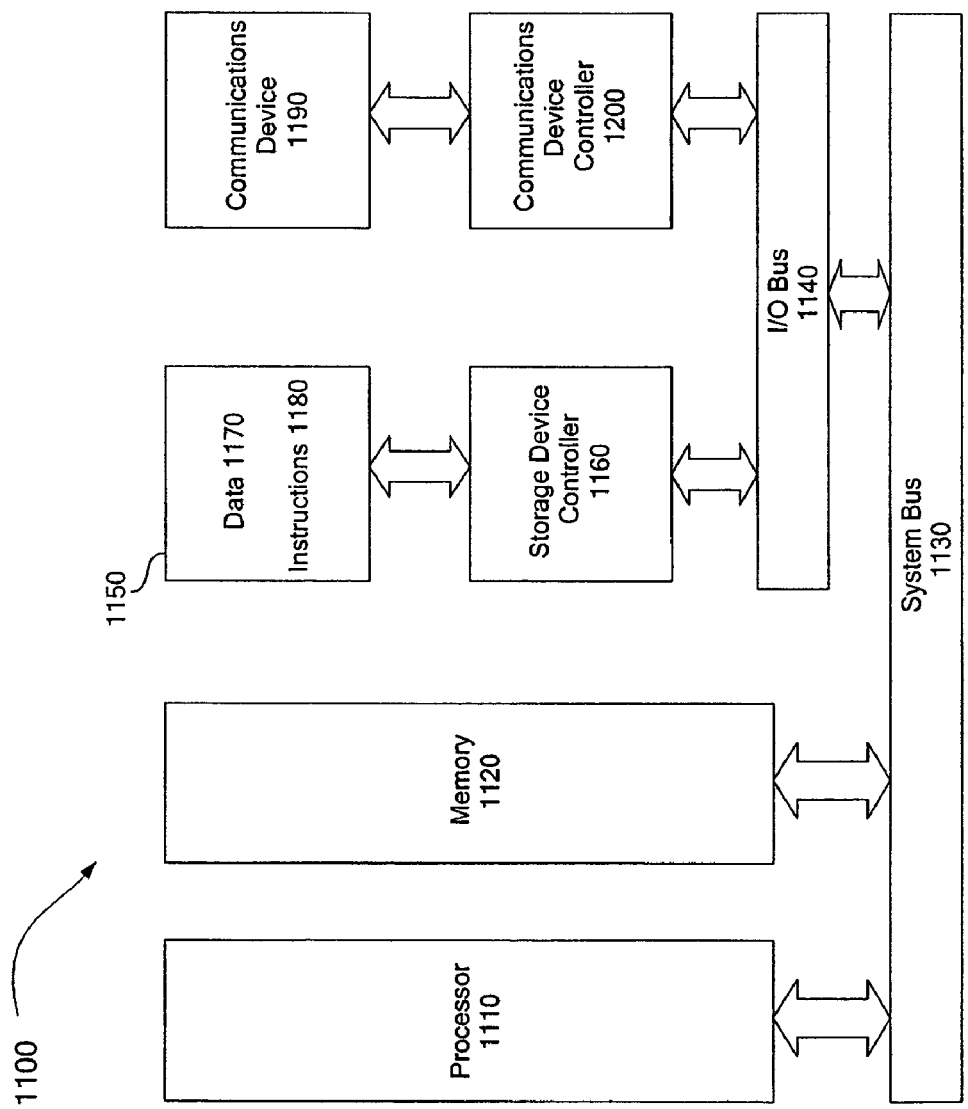
FIG. 2A is a block diagram of an exemplary data processing system in which an embodiment of the present invention can be implemented.

For example, the present invention can be implemented on a general purpose computer. FIG. 2A is an architecture diagram for an exemplary data processing system 1100, which could be used as an LER and/or LSR for performing operations as an originating, transit, or egress node in accordance with exemplary embodiments of the present invention described in detail below.

Data processing system 1100 includes a processor 1110 coupled to a memory 1120 via system bus 1130. The processor is also coupled to external Input/Output (I/O) devices (not shown) via the system bus 1130 and an I/O bus 1140. A storage device 1150 having a computer-readable medium is coupled to the processor 1110 via a storage device controller 1160 and the I/O bus 1140 and the system bus 1130. The storage device 1150 is used by the processor 1110 and controller 1160 to store and read/write data 1170 and program instructions 1180 used to implement the procedures described below. For example, those instructions 1180 can perform any of the methods described below for operation as an originating node (in conjunction with FIGS. 3, 4, 5A, 5B and 5C), a transit node (in conjunction with FIGS. 6, 7A and 7B), and/or a terminating node (in conjunction with FIGS. 9, 10, 11A, 11B and 11C).

The processor 1110 may be further coupled to a communications device 1190 via a communications device controller 1200 coupled to the I/O bus 1140. The processor 1110 uses the communications device 1190 to communicate with a network (not shown in FIG. 2A) transmitting multiple flows of data as described below.

In operation, the processor 1110 loads the program instructions 1180 from the storage device 1150 into the memory 1120. The processor 1110 then executes the loaded program instructions 1180 to offer differentiated services for network traffic that arrives at data processing system 1100 and is enqueued in memory 1120. Thus, processor 1110 operates under the control of the instructions 1180 to perform the methods of this invention, as described in more detail below.

Figure 2B:
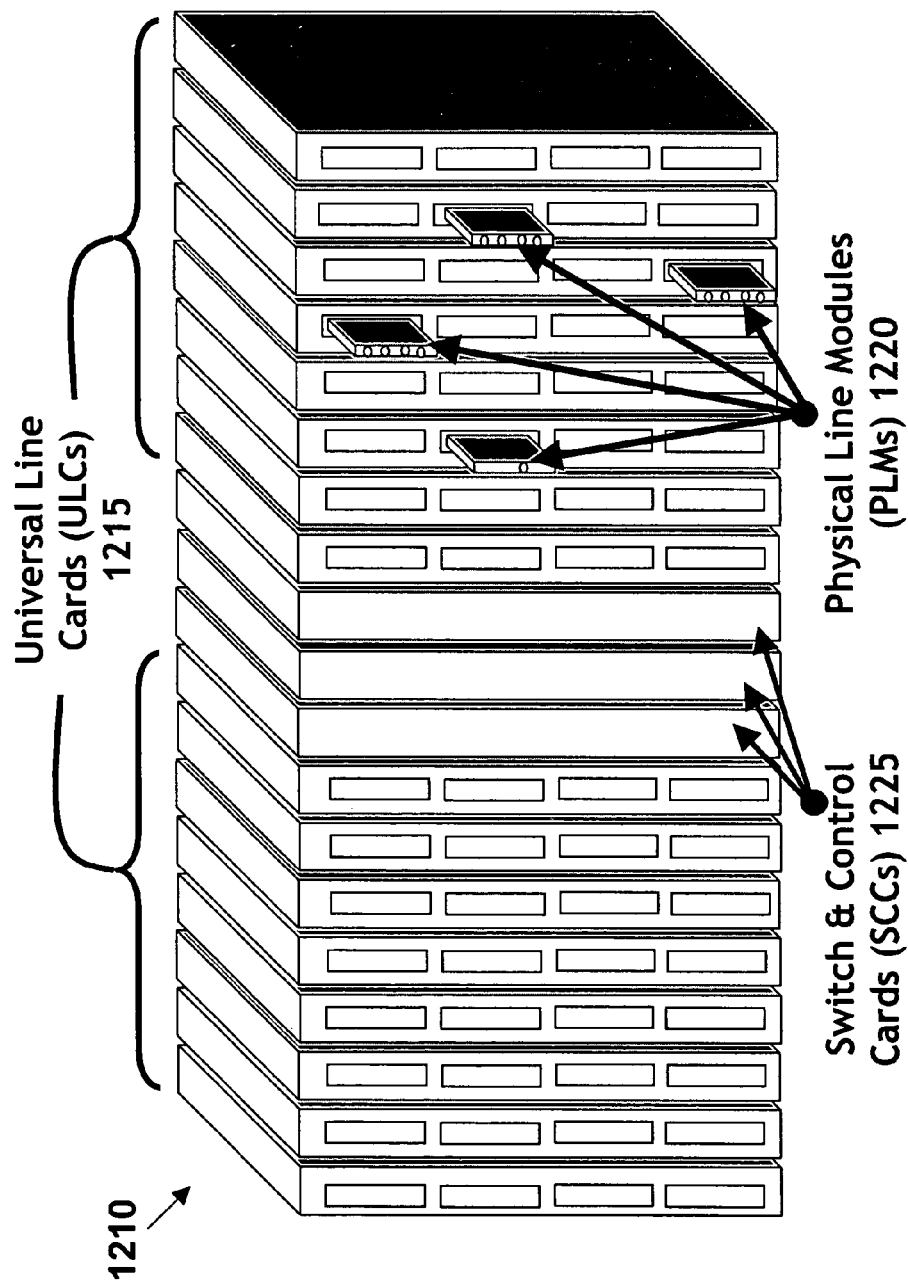
FIG. 2B is a perspective view of a configuration of an exemplary network router in which an embodiment of the present invention can be implemented.

The present invention can also be implemented, for example, in a network router. FIG. 2B is a perspective view of one configuration of a network router 1210 having sixteen universal line cards (ULCs) 1215. Each ULC 1215 has four physical line modules (PLMs) 1220 for connecting with physical network lines to receive and transmit network traffic. The router 1210 also has three switch and control cards (SCCs) 1225, which serve as switched paths between each of the ULCs 1215. The SCCs 1225 allow traffic to flow from a first ULC 1215 to a second ULC 1215, for example, when ingress traffic received at a physical line of the first ULC 1215 must be transmitted on a physical line of the second ULC 1215. In particular, each ULC 1215 is connected to the three SCCs 1225 (connections not shown). Network router 1210 could be used as an LER and/or LSR for performing operations as originating, transit, and egress nodes in accordance with exemplary embodiments of the present invention described in detail below.

Figure 2C:
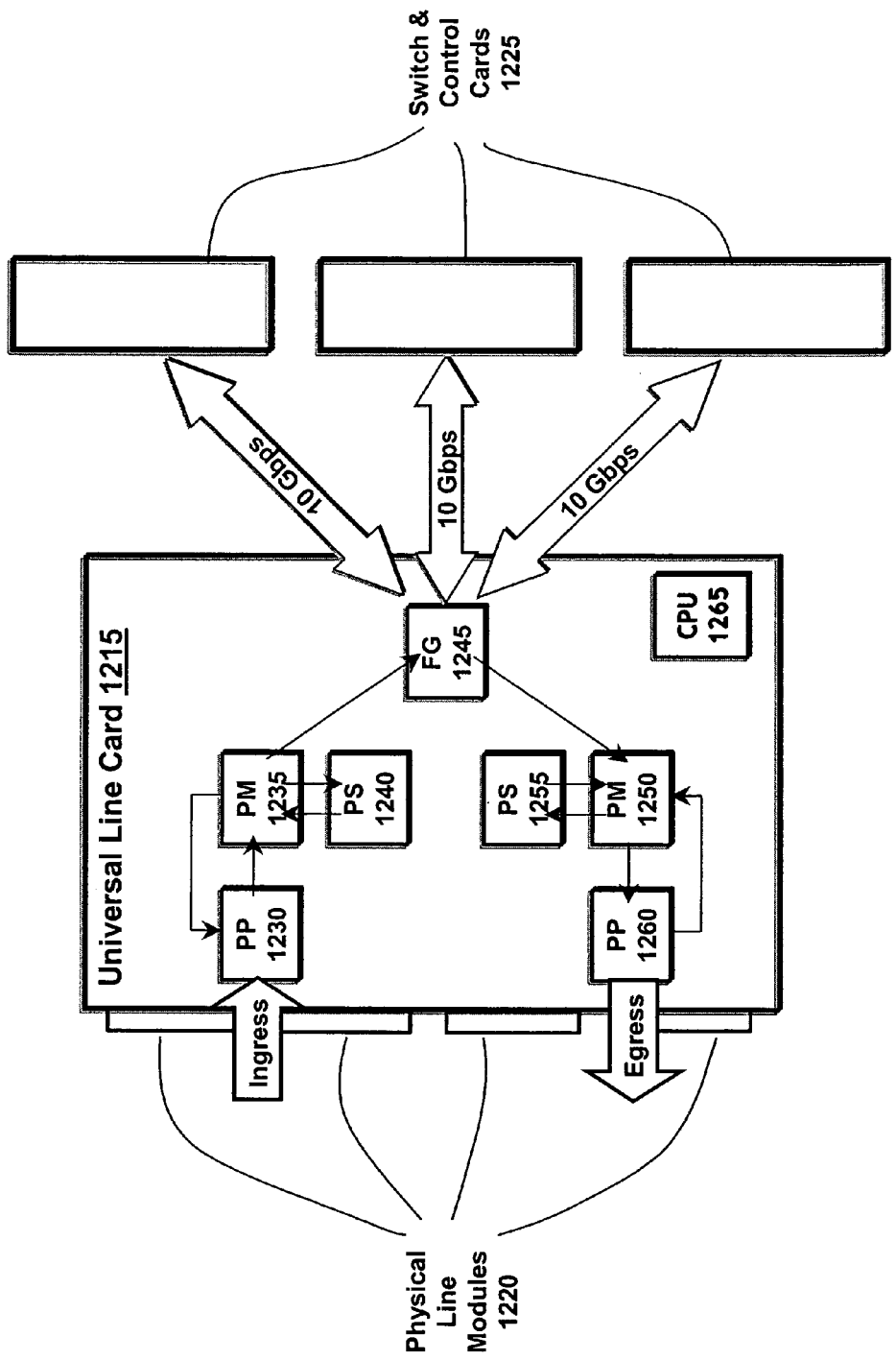
FIG. 2C is a block diagram of an exemplary implementation of the network router of FIG. 2B.

FIG. 2C is a block diagram showing details of a ULC 1215, in which operations according to one embodiment of the present invention are performed. Specifically, ULC 1215 preferably includes several application specific integrated circuits (ASICs), such as packet processor (PP) 1230, packet manager (PM) 1235, packet scheduler (PS) 1240, fabric gateway (FG) 1245, PM 1250, PS 1255, and PP 1260. ULC 1215 also includes a general purpose processor CPU 1265 (connections not shown). The ASICs and CPU 1265 of ULC 1215 are configured to perform the methods of the present invention, as described in more detail below.

Generally, ingress traffic received through a PLM 1220 preferably is processed by an "ingress side" of ULC 1215, which includes PP 1230, PM 1235, and PS 1240. Traffic from the "ingress side" is sent to FG 1245, which transmits the traffic through one of the SCCs 1225 to an "egress side" of one of the ULCs 1215 having the correct PLM 1220 for transmitting the traffic to the next network destination. The "egress side," which is not necessarily on the same ULC 1215 as the "ingress side" (although it is not shown as such in FIG. 2C, for convenience), includes PM 1250, PS 1255, and PP 1260. The traffic is received by the corresponding FG 1245 at the "egress side," and the traffic is processed by PM 1250, PS 1255, and PP 1260 for transmitting onto the network via a PLM 1220. CPU 1265 performs functions such as communicating with the SCCs and programming the PPs, PMs, and PSs as needed. FG 1245 serves as a gateway to the SCCs to transmit traffic to and receive traffic from the SCCs.

Illustrative embodiments of the present invention will now be described. Each embodiment is described as being implemented within an MPLS-capable network environment, such as the network shown in FIG. 1, although one skilled in the art will appreciate that the invention can be applied in different network environments as well, and can operate using many different protocols and traffic types. The exemplary embodiments of the present invention described below are implemented in an MPLS network carrying RFC2547 IP-VPN traffic, and in an MPLS network carrying VPLSNVPWS traffic. These two implementations will be described concurrently, where the embodiments overlap. For convenience, the configuration and behavior for the RFC2547 IP-VPN implementation will be described in detail, and any differences in the VPLSNVPWS implementation will be highlighted.

To illustrate the QoS behavior and implementation of the present invention, the description below divides the network environment into three portions, as illustrated in the following traffic flow diagrams: (1) an ingress (originating) node, corresponding to FIGS. 3 and 4; (2) a transit node, corresponding to FIG. 6; and (3) an egress (terminating) node, corresponding to FIGS. 9 and 10.

Figure 3:
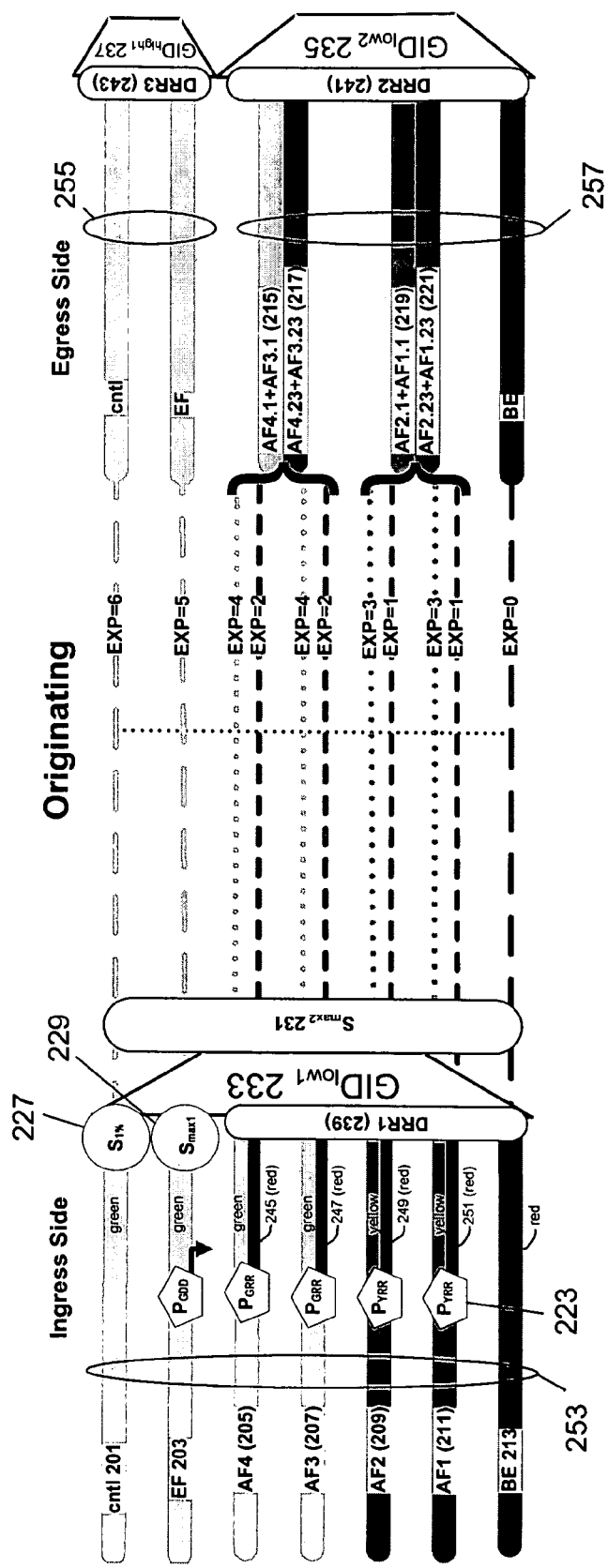
FIG. 3 is a traffic flow diagram of an ingress (originating) node according to one embodiment of the present invention.
Figure 4:
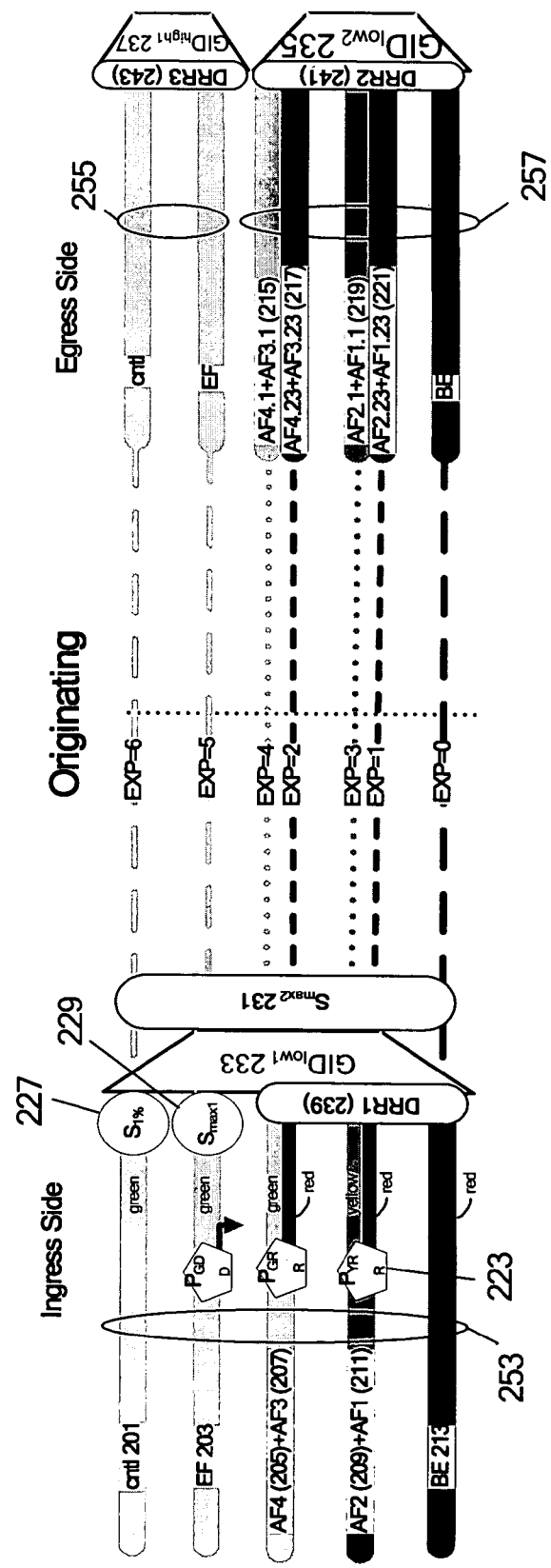
FIG. 4 is a traffic flow diagram of an ingress (originating) node according to another embodiment of the present invention.

Referring first to FIGS. 3 and 4, FIG. 3 illustrates an ingress node of the RFC2547 IP-VPN embodiment, and FIG. 4 shows an ingress node of the VPLSIVPWS embodiment. For example, the embodiments of an ingress node according to the present invention shown in FIGS. 3 and 4 can be implemented on LER 100 of FIG. 1, which would initially receive a customer's network traffic for subsequent transmission through network 101 via an LSP. For the following description, the ingress node is described as having two parts. First, a user access side (labeled "Ingress Side") corresponds to the "ingress side" of ULC 1215, described above. Second, an originating label switched path (LSP) side (i.e., a network side, labeled "Egress Side") corresponds to the "egress side" of ULC 1215, described above. The embodiments of ingress nodes described below illustrate the present invention's use of separate per flow queuing, aggregation into group queues, and congestion management to provide differentiated services.

Various types of traffic are shown, including user control traffic (cntl 201), expedited forwarding traffic (EF 203), best effort traffic (BE 213), and several types of assured forwarding (AF) traffic such as AF4 (205), AF3 (207), AF2 (209), AF1 (211), AF4.1+AF3.1 (215), AF4.23+AF3.23 (217), AF2.1+AF1.1 (219), and AF2.23+AF1.23 (221). Also shown are policers 223 (only one policer is labeled), traffic shapers $S_{1\%}$ 227, $S_{max1}$ 229, and $S_{max2}$ 231, group queues $GID_{low1}$ 233, $GID_{low2}$ 235, and $GID_{high1}$ 237, and deficit round robin (DRR) schedulers DRR1 239, DRR2 241, and DRR3 243. The policers, shapers, and schedulers can be implemented as software modules, which operate on traffic stored in the queues, although in other embodiments they may be circuitry or a combination of circuitry and software.

Figure 5A:
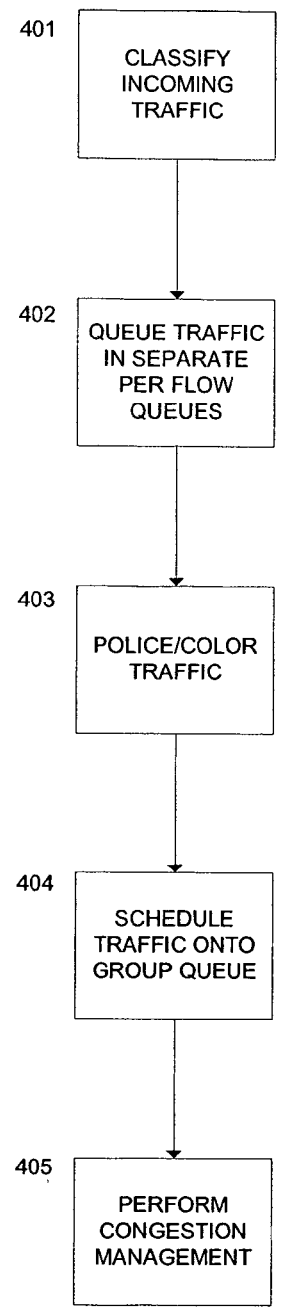
FIGS. 5A and 5B are process flowcharts of a method of servicing traffic in an ingress (originating) node according to one embodiment of the present invention.

Referring now to FIG. 5A, along with FIGS. 2C, 3 and 4, the operations of the Ingress Side of the ingress node will now be described in detail.

Incoming traffic is classified (401) by PP 1230 based on priority using Differentiated Service Code Point (DSCP) via access control lists (ACLs). While in other embodiments, other methods of classifying traffic can be used, ACLs are preferred because they can offer flexibility in the classification procedure. For example, internet protocol (IP) and media access control (MAC) ACLs can be used. Using IP ACLs, a user, such as a customer, can classify the traffic not only on DSCP but also on other fields in Layer3 and Layer4 headers such as, for example, source IP address, destination IP address, IP Protocol, source port, destination port, and others. Similarly, the embodiment can receive traffic that has been previously classified by a user via MAC ACLs, a user can classify the traffic not only on 802.1p bits but also on other fields in the Ethernet header such as, for example, source MAC address, destination MAC address, ethertype, and others.

Next, the traffic is queued (402) into separate per flow queues. In particular, PP 1230 determines the queue in which to place the traffic, and PM 1235 stores the traffic in queues. Referring specifically to FIG. 3, separate per flow queues are used for the following traffic—cntl 201 (e.g. MP-eBGP in the RFC2547 case), EF 203, AF4 (205), AF3 (207), AF2 (209), AF1 (211) and BE 213. In contrast to the RFC2547 IP-VPN embodiment, in the VPLS/VPWS embodiment shown in FIG. 4, AF4 (205) and AF3 (207) share a queue, and AF2 (209) and AF1 (211) share a queue.

Returning to FIG. 5A, the traffic is policed/colored (403) by PS 1240. In particular, policing determines that traffic is "in contract" if the amount of traffic in the particular queue is less than or equal to a contractual limit set forth in the SLA. If the amount of traffic exceeds the contractual limit, policing determines the traffic is "out of contract." As shown in FIGS. 3 and 4, the queue carrying EF 203 is policed by a policer 223, and only "in contract" traffic is allowed to pass, while "out of contract" traffic is discarded. The cntl 201 and EF 203 are marked as "green" traffic for the purpose of congestion control, which is described in more detail below. The AF queues are policed by policers 223 to mark the traffic as "in contract" or "out of contract." The "in contract" AF4 (205) and AF3 (207) traffic is marked "green," and the "in contract" AF2 (209) and AF1 (211) traffic is marked as "yellow" traffic for congestion control. The "out of contract" AF traffic is marked as "red" traffic, e.g., AF4 Red 245, AF3 Red 247, AF2 Red 249, and AF1 Red 251 (FIG. 3). BE 213 is marked as "red," i.e., "out of contract."

Returning to FIG. 5A, after policing, the traffic is scheduled (404) by PS 1240 onto a group queue $GID_{low1}$ 233, which is preferably stored in PS 1240. In particular, as shown in FIGS. 3 and 4, cntl 201 and EF 203 are shaped by shapers $S_{1\%}$ 227 and $S_{max1}$ 229, respectively. Specifically, the shapers limit the traffic flow to a predetermined amount. The queues carrying EF 203 and cntl 201 are considered strict priority queues. The strict priority queues (carrying cntl 201 and EF 203) take precedence over weighted queues (carrying AF traffic and BE 213) in terms of scheduling, with all the per flow queues aggregating into $GID_{low1}$ 233. The queues carrying the AF and BE traffic are considered weighted queues and the traffic in the weighted queues is scheduled by DRR1 239 onto $GID_{low1}$ 233. The user can change the weights of weighted queues (carrying AF and BE traffic), though default weights can be set according to the user's needs.

The rate of traffic flow of $GID_{low1}$ 233 can be set by $S_{max2}$ 231, which, for example, helps a service provider to control the incoming traffic and enforce service level agreements (SLAs), offering aggregate committed information rate and excess information rate (CIR+EIR) to customers.

Congestion management is performed (405) by PS 1240 at the Ingress Side (FIGS. 3 and 4). Specifically, a congestion algorithm is utilized at $GID_{low1}$ 233 to discard traffic based on a specified preference order. The congestion algorithm is described in more detail below in reference to FIGS. 12, 13 and 14. At $GID_{low1}$ 233, discard order is BE 213 and AF "out of contract" traffic, followed by AF1 (211) and AF2 (209) "in contract," followed by AF3 (207) and AF4 (205) "in contract," EF 203 and cntl 201. For AF and BE traffic under congestion control, higher-weighted queues receive preference over, i.e., will be discarded less often than, "out of contract" AF and BE traffic and "in contract" AF traffic (however, they will not result in "out of contract" AF traffic getting preference over "in contract" traffic from lower weighted AF classes). In particular, higher-weighted queues preferably are marked with a higher-priority color than "out of contract" traffic.

Figure 5B:
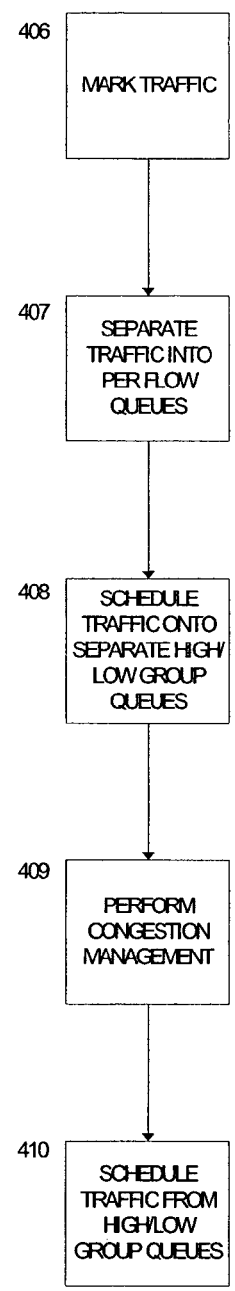

Referring to FIG. 5B, along with FIGS. 2C, 3 and 4, the features of the Egress Side of the ingress node will now be described in detail.

The traffic is marked (406) with an EXP number by PP 1260. The EXP number preferably corresponds to a priority of the traffic, as shown in the following table:

TABLE 1

Traffic type to EXP mapping

| Traffic | EXP Value |
|---|---|
| User Control | 6 |
| EF | 5 |
| (AF4 and AF3) in contract | 4 |
| (AF2 and AF1) in contract | 3 |
| (AF4 and AF3) out of contract | 2 |
| (AF2 and AF1) out of contract | 1 |
| BE | 0 |

The traffic is separated (407) into per flow queues based on priority. In particular, PP 1260 determines the queue in which to store the traffic, and PM 1250 stores the traffic in the queues. The traffic is then scheduled (408) by PS 1255 onto separate high or low group queues, which are located in PS 1255, according to priority. Specifically, cntl 201 and EF 203, which are marked. with EXP values of EXP=6 and EXP=5, respectively, are placed on separate per flow queues 255. These queues 255 aggregate into $GID_{high1}$ 237, which is a group queue of the highest priority. Cntl 201 and EF 203 queues 255 preferably are scheduled in a round robin manner among themselves, such as by DRR3 243, or are scheduled based on some other scheduling criteria.

The AF and BE traffic are placed on weighted queues 257. Specifically, "in contract" AF4 (205) and AF3 (207), which are marked with EXP=4, are placed in a queue 215 for AF4.1+ AF3.1 traffic. "In contract" AF2 (209) and AF1 (211), which are marked with EXP=3, are placed in a queue 219 for AF2.1+ AF1.1 traffic. AF4 Red 245 and AF3 Red 247, which are marked with EXP=2, are placed in a queue 217 for AF4.23+ AF3.23 traffic. AF2 Red 249 and AF1 Red 251, which are marked with EXP=1, are placed in a queue 221 for AF2.23+ AF1.23 traffic. BE 213, which is marked with EXP=0, is placed in a queue for BE traffic. Accordingly, in $GID_{low2}$ 235 in both the RFC2547 IP-V,PN and the VPLS/VPWS embodiments, the traffic classes AF4 and AF3 share a queue, and traffic classes AF2 and AF1 share a queue. BE continues to be marked as "out of contract" traffic and is on a separate BE queue, usually with a minimal weight.

The weighted queues 257 are scheduled by DRR2 241 and aggregate into $GID_{low2}$ 235, which is a group queue of the lower priority. The weights can be set in a multiple of fractional maximum transmission unit (MTU) bytes for the weighted queues 257.

The group queues, $GID_{high1}$ 237 and $GID_{low2}$ 235 correspond to a single interface, such as a physical network line, in a preferred embodiment. As a consequence, the user control and EF traffic from all LSPs goes through the same $GID_{high1}$ 237, and weighted traffic (AF and BE) from all LSPs goes through the same $GID_{low2}$ 235.

Congestion management is performed (409) by PS 1255 at the Egress Side (congestion at the interface). Preferably, the congestion algorithm described in more detail below is utilized at $GID_{low2}$ 235 and $GID_{high1}$ 237 to discard traffic based on a specified preference order, such as, for example, the "out of contract" traffic (e.g., BE 213, AF1 Red 251, AF2 Red 249, AF3 Red 247, AF4 Red 245 in FIG. 3) in an LSP being discarded before the AF "in contract" traffic, followed by EF 203 and cntl 201. Among the AF "in contract" traffic, AF1 and AF2 "in contract" traffic is discarded before AF3 and AF4 "in contract" traffic.

The group queues, $GID_{high1}$ 237 and $GID_{low2}$ 235, are scheduled (410) in strict priority mode with respect to each other. Preferably, $GID_{high1}$ 237 has higher priority than $GID_{low2}$ 235. This ensures that user control and EF traffic get precedence over the AF and BE traffic.

In order to support open bandwidth or auto open bandwidth LSPs, shaping on $GID_{high1}$ 237 and $GID_{low2}$ 235 can be turned off, that is, shaping is set to a high rate. In addition, none of the individual queues (user control, EF, AF and BE traffic) are policed.

In the case of multiple open bandwidth or auto open bandwidth LSPs going over an interface, in one embodiment all LSPs can be treated as equal; in other words, no prioritization or bias among the LSPs. Moreover, as described earlier all of the open bandwidth LSPs going through an interface share the same group queues ($GID_{high1}$ 237 and $GID_{low2}$ 235) which can help ensure that fairness among the LSPs is maintained.

Figure 5C:
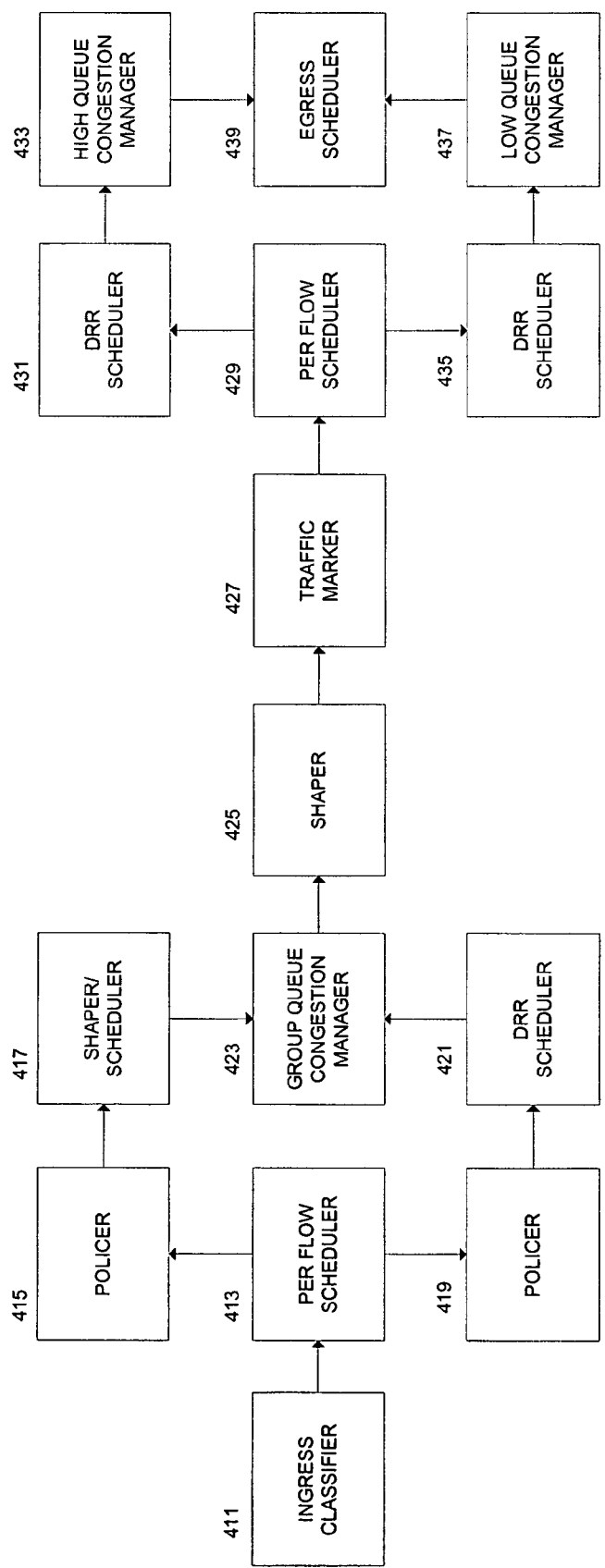
FIG. 5C is a collaboration diagram for functional modules for servicing traffic in an ingress (originating) node according to one embodiment of the present invention.

Having described the sequence of operations within an ingress (originating) node, specific functional modules implementing the above-described operations from FIGS. 5A and 5B will now be described. FIG. 5C is a collaboration diagram for functional modules deployed in an ingress (originating) node, such as LER 100, for offering differentiated services in accordance with an exemplary embodiment of the present invention. The functional modules can be implemented as software modules or objects. In other embodiments, the functional modules may be implemented using hardware modules or other types of circuitry, or a combination of software and hardware modules. In particular, the functional modules can be implemented via the PPs, PMs, and PSs described above.

In operation, an ingress node classifier 411 classifies incoming traffic preferably according to DSCP, and a per flow scheduler 413 queues traffic into separate per flow queues. For cntl and EF traffic, a policer 415 discards "out of contract" EF traffic and marks cntl and "in contract" EF traffic as "green." A shaper/scheduler 417 limits cntl and EF traffic to predefined limits and schedules the traffic onto $GID_{low1}$ 233 in strict priority over the AF and BE traffic. For the AF and BE traffic, a policer 419 marks the AF traffic as "in contract" or "out of contract." The "in contract" AF4 (205) and AF3 (207) traffic is marked "green," and the "in contract" AF2 (209) and AF1 (211) traffic is marked as "yellow." The "out of contract" AF traffic is marked as "red" traffic, and BE 213 is marked as "red." A DRR scheduler 421 schedules AF and BE traffic onto $GID_{low1}$ 233 in a deficit round robin manner, or using other scheduling criteria.

A group queue congestion manager 423 applies congestion control to the traffic, and a shaper 425 limits traffic from $GID_{low1}$ 233. A traffic marker 427 marks traffic with corresponding EXP numbers, and a per flow scheduler 429 schedules the marked traffic into separate per flow queues. A DRR scheduler 431 preferably schedules EXP=6 and EXP=5 traffic onto $GID_{high1}$ 237 in a deficit round robin manner (or using another suitable scheduling technique), and a high queue congestion manager 433 applies congestion management to $GID_{high1}$ 237. For the EXP=0 to EXP=4 traffic, a DRR scheduler 435 schedules the traffic onto $GID_{low2}$ 235, and a low queue congestion manager 437 applies congestion management to $GID_{low2}$ 235. Finally, an egress scheduler 439 schedules traffic from $GID_{high1}$ 237 and $GID_{low2}$ 235, with traffic from $GID_{high1}$ 237 preferably being scheduled in strict priority over traffic from $GID_{low2}$ 235.

Figure 6:
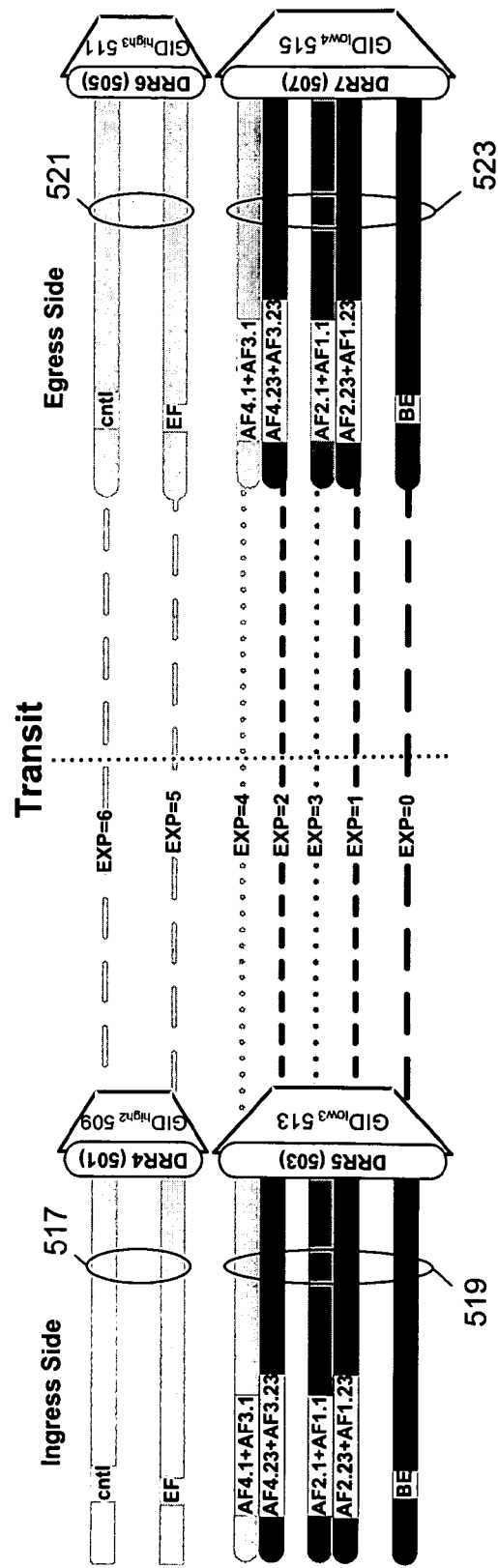
FIG. 6 is a traffic flow diagram of a transit node according to one embodiment of the present invention.

Traffic scheduled from an ingress (originating) node in the above-described manner is then sent to a transit node (or an egress (terminating) node). For example, a customer's network traffic is sent from an ingress node implemented in LER 100 to a transit node implemented in LSR 105. Turning now to FIG. 6, a transit node according to one embodiment of the present invention will now be described. For example, the embodiment shown in FIG. 6 could be implemented in LSR 105 of FIG. 1. The configuration and operation of the transit node of the present embodiment is operable to receive traffic from an ingress node of the RFC2547 IP-VPN embodiment (FIG. 3) and an ingress node of the VPLS/VPWS embodiment (FIG. 4). The transit node is shown as having two parts: an "Ingress Side"; and an "Egress Side." The transit node includes deficit round robin schedulers, DRR4 501, DRR5 503, DRR6 505, and DRR7 507, and group queues $GID_{high2}$ 509, $GID_{high3}$ 511, $GID_{low3}$ 513, and $GID_{low4}$ 515. The transit node preserves the EXP values for LSP traffic flowing through it. In addition, traffic prioritization in a transit node is same as the originating node. The policers, shapers, and schedulers can be implemented as software modules, which operate on traffic stored in the queues, although in other embodiments they may be circuitry or a combination of circuitry and software.

The embodiment of a transit node described below illustrate the present invention's use of separate per flow queuing, aggregation into group queues, and congestion management to provide differentiated services.

Figure 7A:
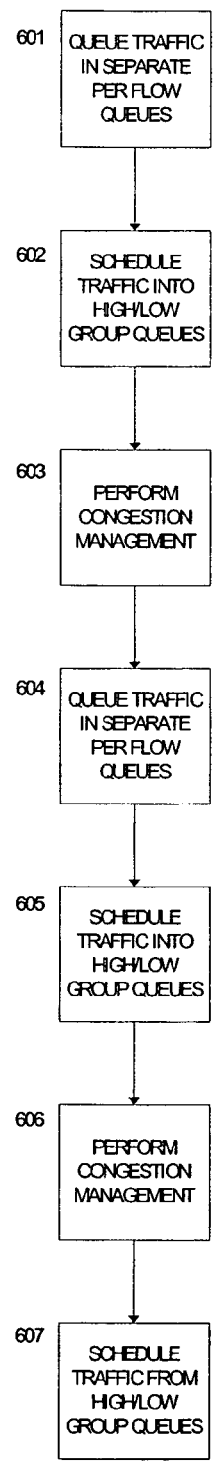
FIG. 7A is a process flowchart of a method of servicing traffic in a transit node according to one embodiment of the present invention.

Referring to FIG. 7A, along with FIGS. 2C and 6, the operations performed by the transit node will now be described in detail.

At ingress, traffic is queued (601) in separate per flow queues. In particular, PP 1230 determines the queue in which to store the traffic, and PM 1235 stores the traffic in queues. The traffic is scheduled (602) by PS 1240 into a high priority or low priority group queue, where congestion management, described in more detail below, is performed (603). At egress the process is repeated. Specifically, traffic is queued (604) by PP 1260 and PM 1250 in separate per flow queues, and scheduled (605) by PS 1255 into a high priority or low priority group queue, where congestion management, described in more detail below, is performed (606). Traffic is then scheduled (607) from the high priority and low priority group queues by PS 1255.

For example, in a preferred embodiment of the invention, user control and EF traffic are carried by the strict priority queues 517 and 521, which are scheduled by DRR4 501 and DRR6 505, respectively, and aggregated into the group queues $GID_{high2}$ 509 and $GID_{high3}$ 511. The user control and EF queues 517 and 521 are scheduled in round robin manner among themselves through DRR4 501 and DRR6 505, although other scheduling criteria also may be used.

AF and BE traffic are mapped to weighted queues 519 and 523 for scheduling by DRR5 503 and DRR7 507, respectively, and the resulting traffic is aggregated into the group queue, $GID_{low3}$ 513 and $GID_{low4}$ 515. Instead of putting each AF traffic type on a separate queue, AF4 and AF3 traffic are mapped on one queue and AF2 and AF1 traffic are mapped on another queue. This setup allows the number of per flow queues on a universal line card (ULC) to be conserved, and thereby can help to scale the transit LSPs over an interface to a reasonably large number.

Similar to the description above regarding the ingress node, the group queues at each interface are preferably scheduled in strict priority mode, with $GID_{high2}$ 509 having higher priority than $GID_{low3}$ 513, and $GID_{high3}$ 511 having higher priority than $GID_{low4}$ 515. The group queues, $GID_{high3}$ 511 and $GID_{low4}$ 515 are per interface, that is, all the LSPs on a given interface are transmitted through $GID_{high3}$ 511 and $GID_{low4}$ 515.

Preferably, when a node is acting as a transit node, the shapers at the group queues are kept disabled. Also, there is no policing at the per flow queues (user control, EF, AF, and BE queues). Accordingly, traffic shapers and policers are not shown in FIG. 6.

In addition, under congestion at the interfaces, either the Ingress Side or the Egress Side, a congestion algorithm described in more detail below is utilized at the group queues of the corresponding interface to discard traffic based on a specified preference order. For example, at the Ingress Side, which corresponds to $GID_{high2}$ 509 and $GID_{low3}$ 513, BE traffic and "out of contract" AF traffic (EXP=0, EXP=1, and EXP=2 traffic) preferably is discarded before "in contract" AF1 and AF2 traffic (EXP=3 traffic), followed by "in contract" AF3 and AF4 traffic (EXP=4), EF traffic (EXP=5), and user control traffic (EXP=6).

Because the $GID_{high}$ traffic preferably has higher scheduling priority than $GID_{low}$ traffic, the EF and user control traffic from all the transit and ingress nodes take precedence over AF and BE traffic. AF and BE queues 519 and 523 are scheduled in deficit round robin (DRR) mode, or using another scheduling technique.

Figure 7B:
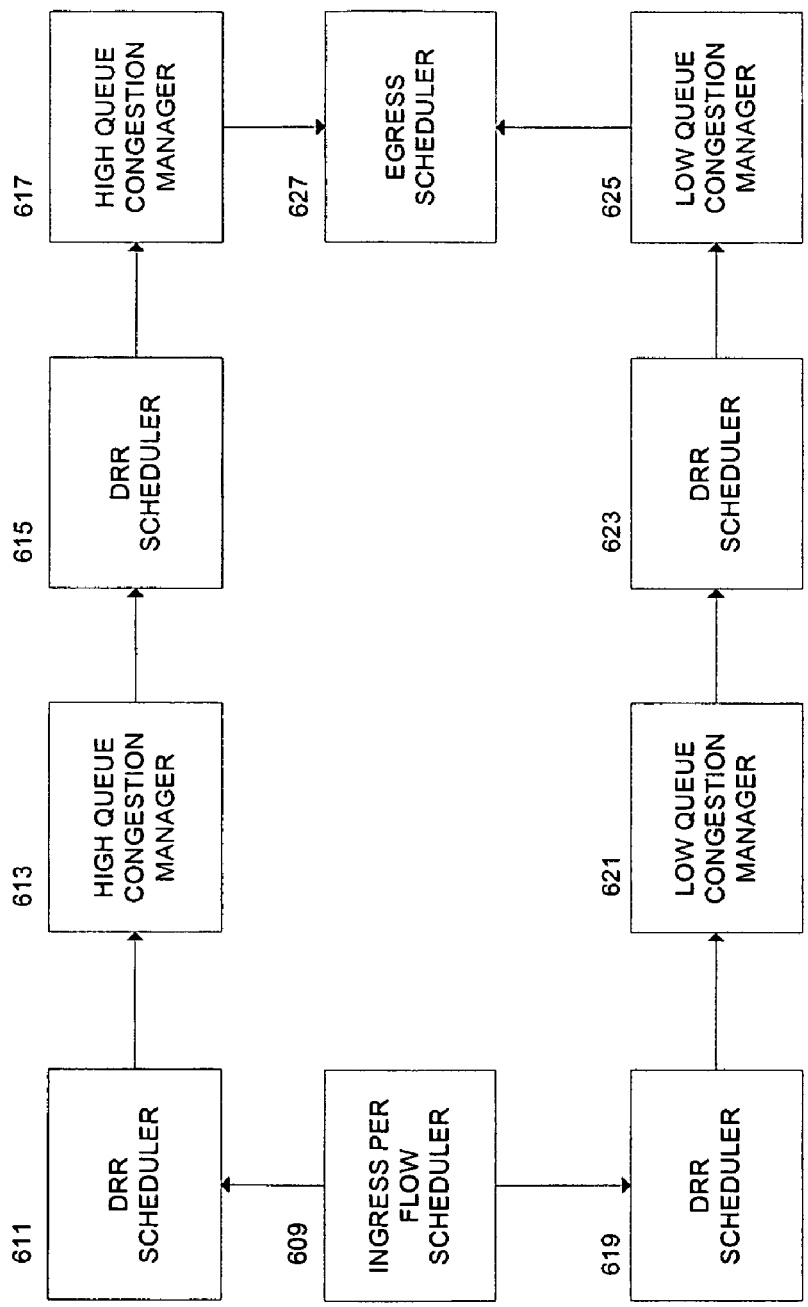
FIG. 7B is a collaboration diagram for functional modules for servicing traffic in a transit node according to one embodiment of the present invention.

Having described the sequence of operations within a transit node, specific functional modules implementing the operations of the node will now be described. FIG. 7B is a collaboration diagram for functional modules deployed in a transit node, such as LSR 105, for offering differentiated services in accordance with an exemplary embodiment of the present invention. The functional modules can be implemented as software modules or objects. In other embodiments, the functional modules may be implemented using hardware modules or other types of circuitry, or a combination of software and hardware modules. In particular, the functional modules can be implemented via the PPs, PMs, and PSs described above.

In operation, an ingress per flow scheduler 609 schedules traffic onto high priority or low priority queues. The cntl and EF traffic is scheduled by a DRR scheduler 611 into $GID_{high2}$ 509, and a high queue congestion manager 613 performs congestion management on $GID_{high2}$ 509. A DRR scheduler 615 schedules traffic from $GID_{high2}$ 509 onto $GID_{high3}$ 511, and high queue congestion manager 617 performs congestion management on $GID_{high3}$ 511.

Similarly, the AF and BE traffic is scheduled by a DRR scheduler 619 into $GID_{low3}$ 513, and a low queue congestion manager 621 applies congestion management. A DRR scheduler 623 then schedules traffic from $GID_{low3}$ 513 onto $GID_{low4}$ 515, and low queue congestion manager 625 applies congestion management. An egress scheduler 627 schedules traffic from $GID_{high3}$ 511 and $GID_{low3}$ 515, with $GID_{high3}$ 511 preferably given strict priority over $GID_{low3}$ 515.

Figure 8:
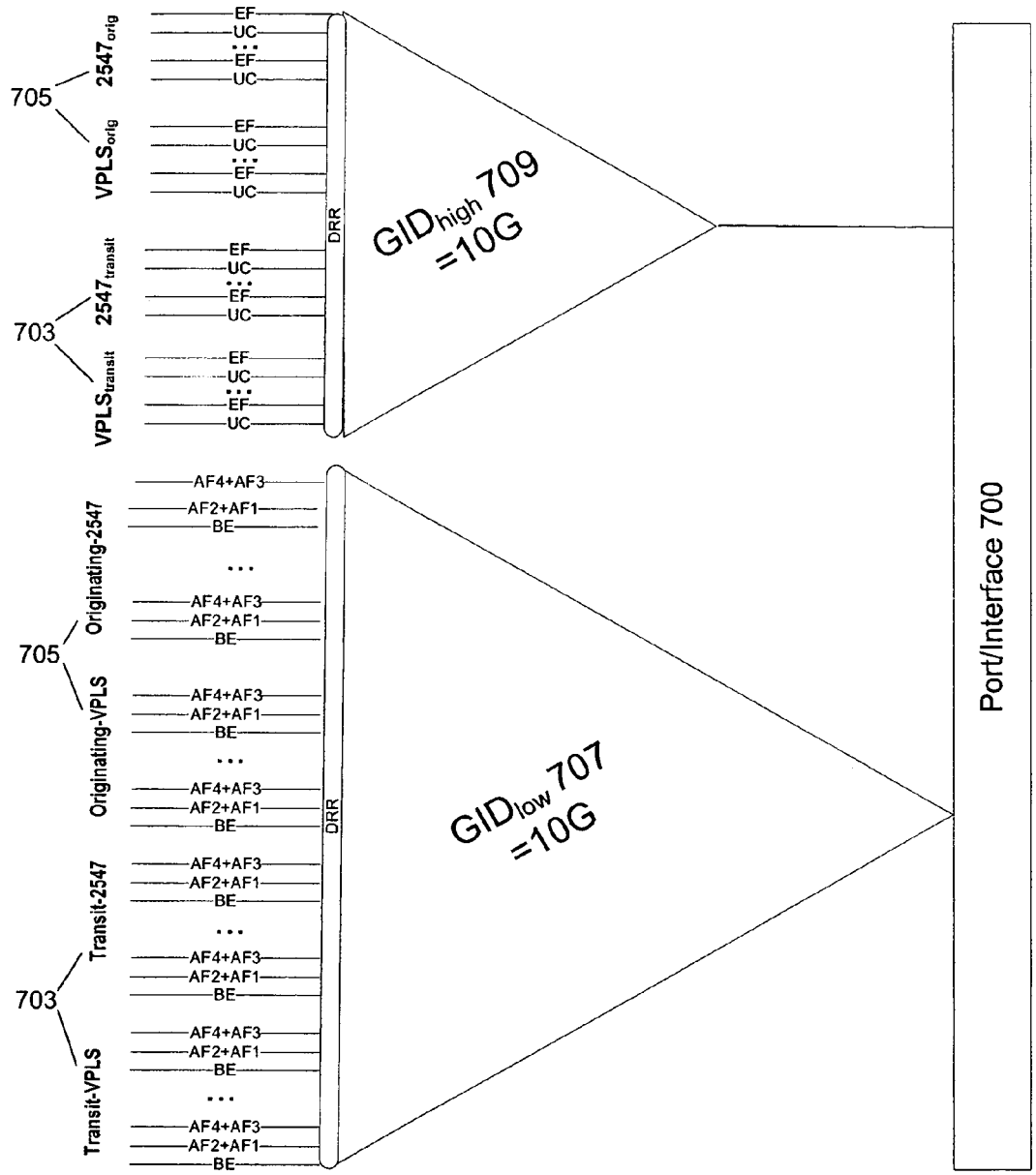
FIG. 8 is a block diagram of an exemplary network interface.

Having described originating and transit nodes, it is noted that transit and originating LSPs can use a common interface (e.g., a physical network line), for example, by aggregating all the per flow queues from transit and originating LSPs behind the same group queues. FIG. 8 shows an example of a single port/interface 700 preferably used by multiple per flow queues of various transit LSPs 703 and originating LSPs 705. Multiple queues of AF and BE traffic are aggregated behind a $GIDIW$ 707 group queue having a byte count of, for example, 10 Gbytes. Multiple per flow queues of user control and EF traffic are aggregated into a $GID_{high}$ 709 group queue having a byte count of, for example, 10 Gbytes.

After having traversed an ingress node, such as LER 100, and possibly one or more transit nodes, such as LSR 105, network traffic reaches an egress (terminating) node, such as LER 120. For example, LER 120 would be the final node of the LSP traversed by a customer's network traffic, and this egress (terminating) node schedules the customer's traffic for forwarding to its final destination.

Figure 9:
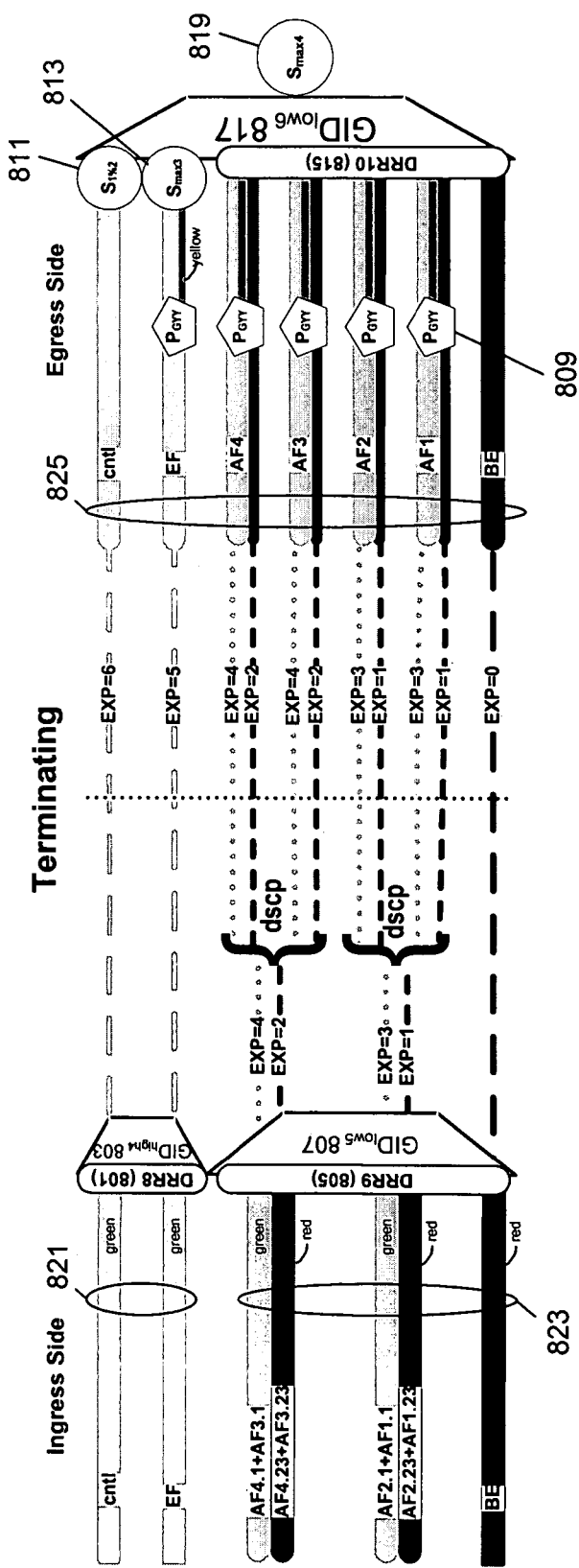
FIG. 9 is a traffic flow diagram of an egress (terminating) node according to one embodiment of the present invention.
Figure 10:
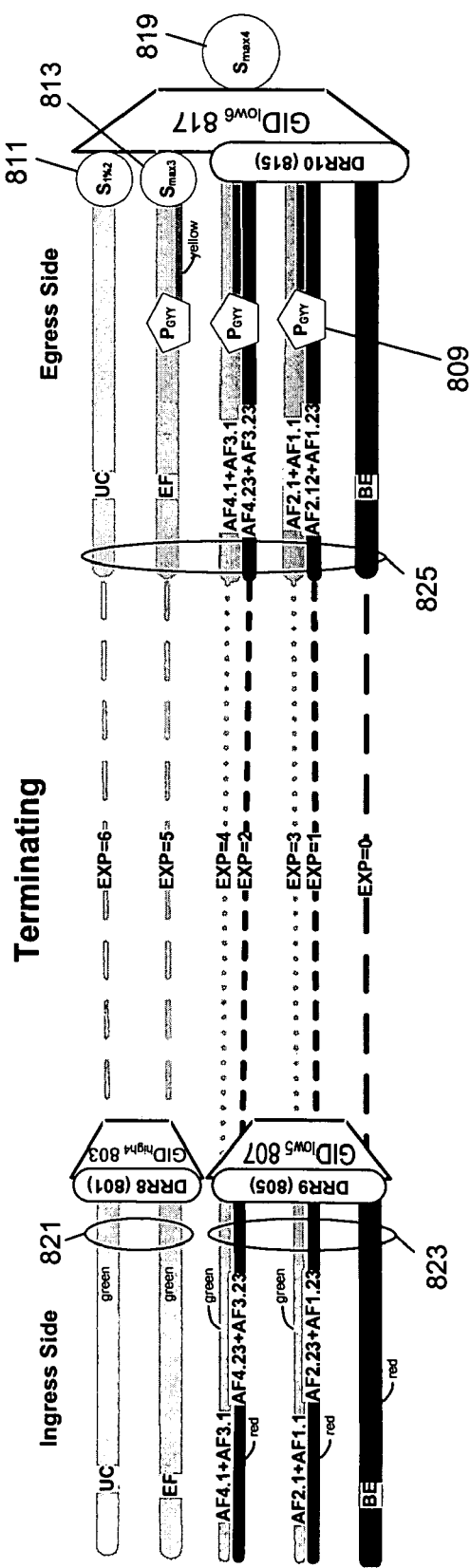
FIG. 10 is a traffic flow diagram of an egress (terminating) node according to another embodiment of the present invention.

Referring now to FIGS. 9 and 10, an egress (terminating) node will now be described in detail. FIG. 9 illustrates an egress node of the RFC2547 IP-VPN embodiment, and FIG. 10 shows an egress node of the VPLSNVPWS embodiment. Similar to the description above regarding the ingress node, for the following description the egress node is described as having two parts: a terminating LSP side (labeled "Ingress Side"); and an egress access side (labeled "Egress Side"). The policers, shapers, and schedulers can be implemented as software modules, which operate on traffic stored in the queues, although in other embodiments they can be circuitry or a combination of circuitry and software.

The embodiments of egress nodes described below illustrate the present invention's use of separate per flow queuing, aggregation into group queues, and congestion management to provide differentiated services.

Figure 11A:
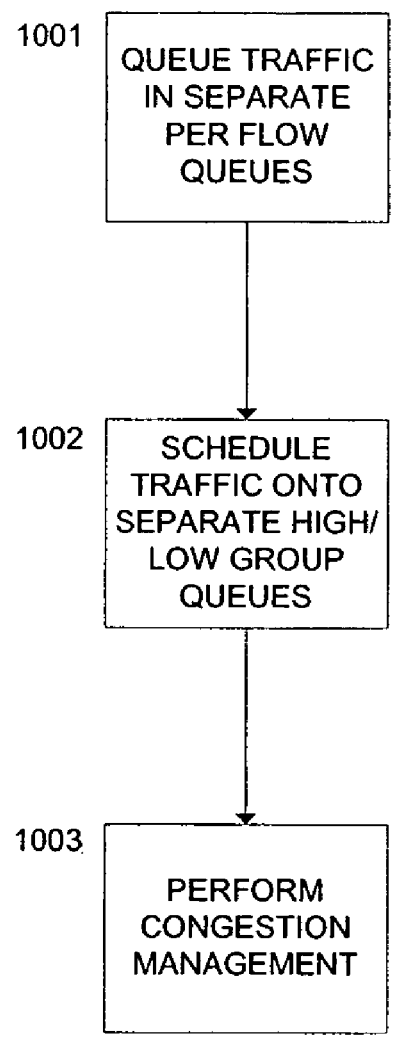
FIGS. 11A and 11B are process flowcharts of a method of servicing traffic in an egress (terminating) node according to one embodiment of the present invention.

Referring also to FIG. 11A in conjunction with FIGS. 2C, 9 and 10, operation of the Ingress Side of the egress node will now be described in detail.

The traffic prioritization in a terminating LSP is handled in the same manner as transit and originating LSPs. Incoming traffic is queued (1001) in separate per flow queues. In particular, PP 1230 determines the queue in which to schedule the traffic, and PM 1235 stores the traffic in the queues. The traffic is scheduled (1002) by PS 1240 onto high or low priority group queues, where congestion management is performed (1003).

Preferably, the user control and EF traffic are placed (1001) into separate queues 821, which are scheduled (1002) by DRR8 801 onto group queue, $GID_{high4}$ 803. AF and BE traffic are mapped (1001) to weighted queues 823 for scheduling (1002) by DRR9 805 onto group queue, $GID_{low5}$ 807. In both the RFC2547 IP-VPN and the VPLS/VPWS embodiments, the AF4 and AF3 traffic share a queue, and the AF2 and AF1 traffic share a queue. The BE traffic is on a separate queue, usually with a minimal weight.

The group queues, $GID_{high4}$ 803 corresponds to a single physical interface (line), and $GID_{low5}$ 807 corresponds to a single interface (line). That is, the user control and EF traffic from all LSPs over an interface is transmitted through a same $GID_{high4}$ 803 group queue, and the weighted traffic (AF and BE) from all LSPs over an interface is transmitted through the same $GID_{low5}$ 807 group queue.

$GID_{high4}$ 803 and $GID_{low5}$ 807 are scheduled in strict priority mode with respect to each other. The $GID_{high4}$ 803 preferably has higher priority than $GID_{low5}$ 807. This helps ensure that EF and user control traffic get precedence over the AF and BE traffic.

The shapers for $GID_{high4}$ 803 and $GID_{low5}$ 807, as well as policing on individual queues, can be turned off in order to accommodate open bandwidth and auto open bandwidth LSPs. Accordingly, traffic shapers and policers are not shown for these GIDs.

Under congestion at the interface, congestion management is performed (1003) by PS 1240. Preferably, BE traffic and "out of contract" AF traffic (EXP=0, EXP=1, and EXP=2) are discarded before "in contract" AF1 and AF2 traffic (EXP=3), followed by "in contract" AF3 and AF4 traffic (EXP=4), EF traffic (EXP=5) and user control traffic (EXP=6).

Figure 11B:
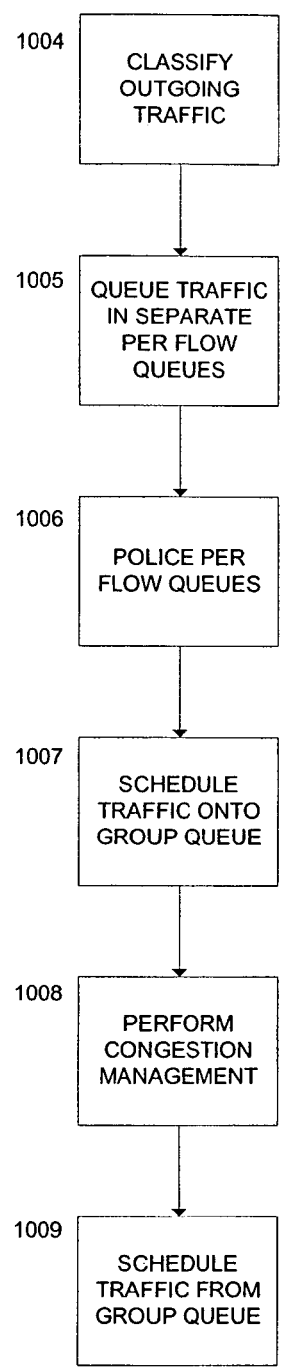

Referring to FIG. 11B, along with FIGS. 2C, 9 and 10, operations of the Egress Side of the egress node will now be described in detail.

For RFC2547 IP-VPN (FIG. 9), the outgoing IP traffic is classified (1004) by PP 1260 based on DSCP into various diffserv classes, enabling the user to apply QoS parameters (policing, appropriate service class, etc . . . ) per diffserv class. The outgoing IP traffic is queued (1005) into multiple per flow queues 825, that is, separate queues for user control, EF, AF4, AF3, AF2, AF1 and BE traffic. In particular, PP 1260 determines the queue in which to schedule traffic, and PM 1250 stores the traffic in the queues. DSCP is preserved in the outgoing IP stream for RFC 2547 IP-VPN traffic. In contrast, for VPLS and multi-class VPWS (FIG. 10), the outgoing AF4 and AF3 traffic share a common queue, and the outgoing AF2 and AF1 traffic share another common queue.

QoS parameters can be applied to the outgoing traffic through policing (1006) the per flow queues 825 by PS 1255. Specifically, the per flow queues carrying EF and AF traffic are policed by policers 809. Preferably, the EXP=3 traffic is treated as "green" upon entering policer 809; this helps EXP=3 traffic compete with EXP=4 traffic for bandwidth. The traffic is then scheduled (1007) by PS 1255 onto a group queue, which preferably is stored in PS 1255. In particular, the user control traffic is shaped by traffic shaper $S_{1\%2}$ 811, the EF traffic is shaped by traffic shaper $S_{max3}$ 813. The user control and EF traffic are considered strict priority queues. The strict priority queues take precedence over weighted queues (carrying AF traffic and BE 213) in terms of scheduling, with all the per flow queues aggregating into $GID_{low6}$ 817. The policed AF traffic and the BE traffic are mapped into separate queues for AF1, AF2, AF3, AF4, and BE traffic, and scheduled by DRR10 815 onto $GID_{low6}$ 817. The rate of traffic flow of $GID_{low6}$ 817 can be set by $S_{max4}$ 819.

Congestion management is performed (1008) by PS 1255 in $GID_{low6}$ 817. Under congestion at the interface, the "out of contract" traffic (BE, AF1 Red, AF2 Red, AF3 Red, AF4 Red) is discarded before the AF "in contract" traffic, EF and control traffic. The queue thresholds preferably are set in such a way that Red traffic is discarded first, followed by Yellow and finally Green. Finally, the traffic is scheduled (1009) from $GID_{low6}$ 817.

Figure 11C:
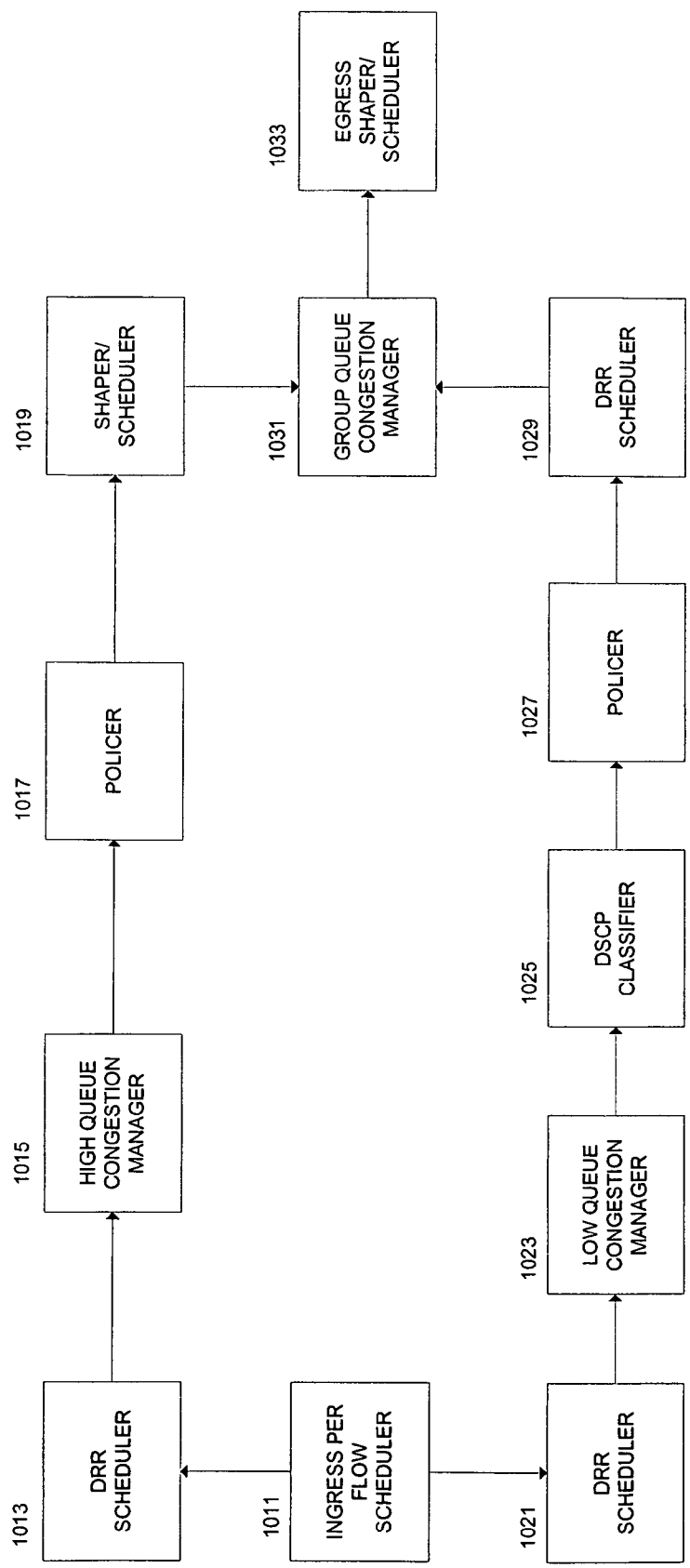
FIG. 11C is a collaboration diagram for functional modules for servicing traffic in an egress (terminating) node according to one embodiment of the present invention.

Having described the sequence of operations within an egress (terminating) node, specific functional modules implementing the operations will now be described. FIG. 11C is a collaboration diagram for functional modules deployed in an egress (terminating) node, such as LER 120, for offering differentiated services in accordance with an exemplary embodiment of the present invention. The functional modules can be implemented as software modules or objects. In other embodiments, the functional modules can be implemented using hardware modules or other types of circuitry, or a combination of software and hardware modules. In particular, the fictional modules can be implemented via the PPs, PMs, and PSs described above.

In operation, an ingress per flow scheduler 1011 schedules incoming traffic onto high priority or low priority queues. The cntl and EF traffic is scheduled by a DRR scheduler 1013 into $GID_{high4}$ 803, and a high queue congestion manager 1015 performs congestion management on $GID_{high4}$ 803. A policer 1017 polices EF traffic and marks "in contract" EF traffic as "green," and "out of contract" EF traffic as "yellow." A shaper/scheduler 1019 limits cntl and EF traffic and preferably schedules the traffic onto $GID_{low6}$ 817 in strict priority over AF and BE traffic.

Similarly, the AF and BE traffic is scheduled by a DRR scheduler 1021 into $GID_{low5}$ 807, and a low queue congestion manager 1023 applies congestion management. A DSCP classifier 1025 classifies traffic preferably according to DSCP, and a policer 1027 marks "in contract" EXP=4 and EXP=3 traffic as "green," marks "out of contract" EXP=4 and EXP=3 traffic as "yellow," and marks EXP=2 and EXP=1 traffic as "red." A DRR scheduler 1029 then schedules traffic onto $GID_{low6}$ 817.

A group queue congestion manager 1031 applies congestion management to $GID_{low6}$ 817, and an egress shaper/scheduler 1033 limits traffic from $GID_{low6}$ 817 and schedules traffic from $GID_{low6}$ 817.

In one advantage of the above embodiments, if open bandwidth transit and terminating LSPs are transmitted over the same interface, the LSPs are fairly treated, since the group queues are shared by all the open bandwidth LSPs traversing over the same interface. This is similar to the case explained above in which open bandwidth transit and originating LSPs traverse over the same interface.

The embodiments described above utilize a congestion algorithm to determine when and how to discard traffic. The congestion algorithm will now be described in detail; however, one skilled in the art will recognize that other suitable congestion methods can be used.

Figure 12:
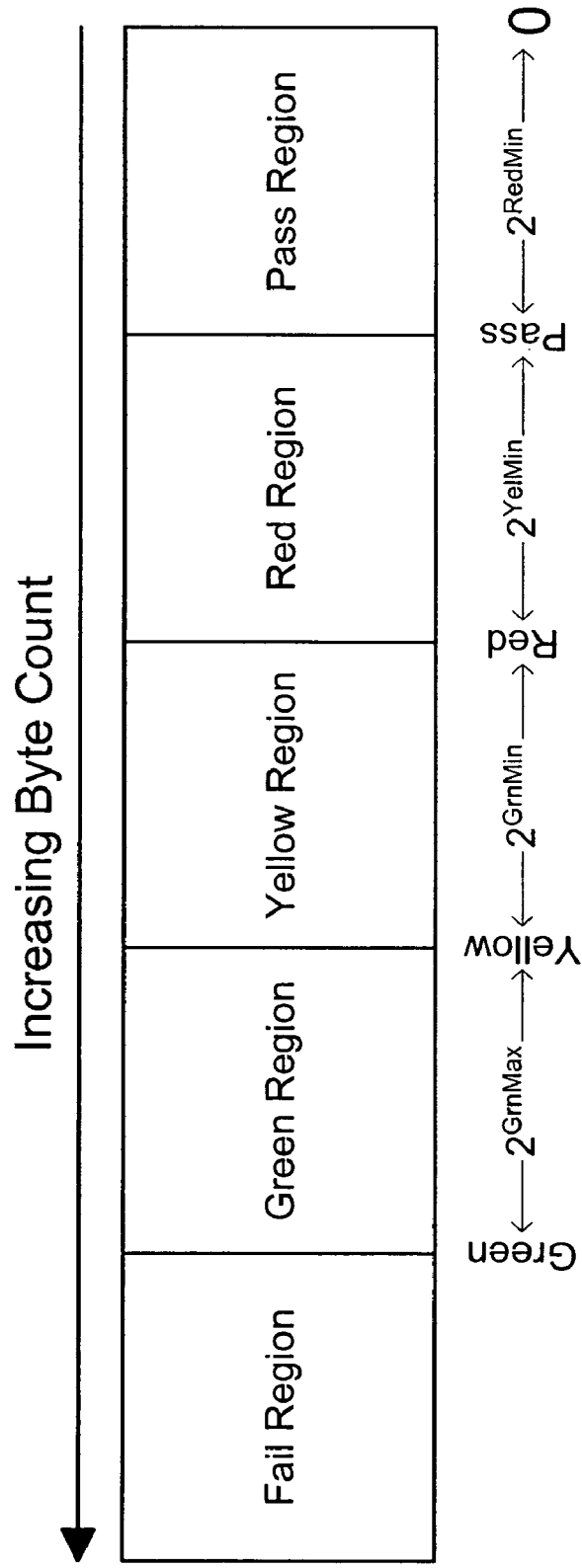
FIG. 12 is a diagram of a congestion management configuration according to one embodiment of the present invention.

The congestion algorithm, or random early discard (RED) algorithm, uses the following factors to decide whether to discard a packet: the color of the packet; the queue byte count size; and congestion parameters. In the case of three colors of traffic (red, yellow, and green), there are four congestion parameters, RedMin, YelMin, GrnMin, and GrnMax. Referring to FIG. 12, the byte count of the queue is divided into regions that are defined by the congestion parameters. Specifically, a Pass value equals $2^{RedMin}$, a Red value equals Pass+$2^{YelMin}$, a Yellow Region equals Pass+Red+$2^{GrnMin}$, a Green value equals Pass+Red+Yellow+$2^{GrnMax}$. A Pass Region corresponds to a byte count range of zero (0) to Pass, a Red region corresponds to a byte count range of Pass to Red, a Yellow Region corresponds to a byte count range of Red to Yellow, a Green Region corresponds to a byte count range of Yellow to Green, and a Fail Region corresponds to a byte count range above Green.

The congestion parameters preferably work in powers of two as shown in FIG. 12. This insures that the distance between two levels is always a power of two, which keeps the number of bits used to hold the parameters to a minimum while allowing values up to $2^{31}$. For example, if the value in RedMin is 5, the Pass value is $2^5$=32, and furthermore if YelMin is 6, the Red value is $2^5$+$2^6$=96. One exception exists, if the parameter is 0, the value is zero and not $2^0$.

When a packet arrives at the queue for which congestion management is performed, the byte count of the queue is compared to the threshold corresponding to the packet color to determine if it is to be passed (scheduled) or discarded.

Figure 13:
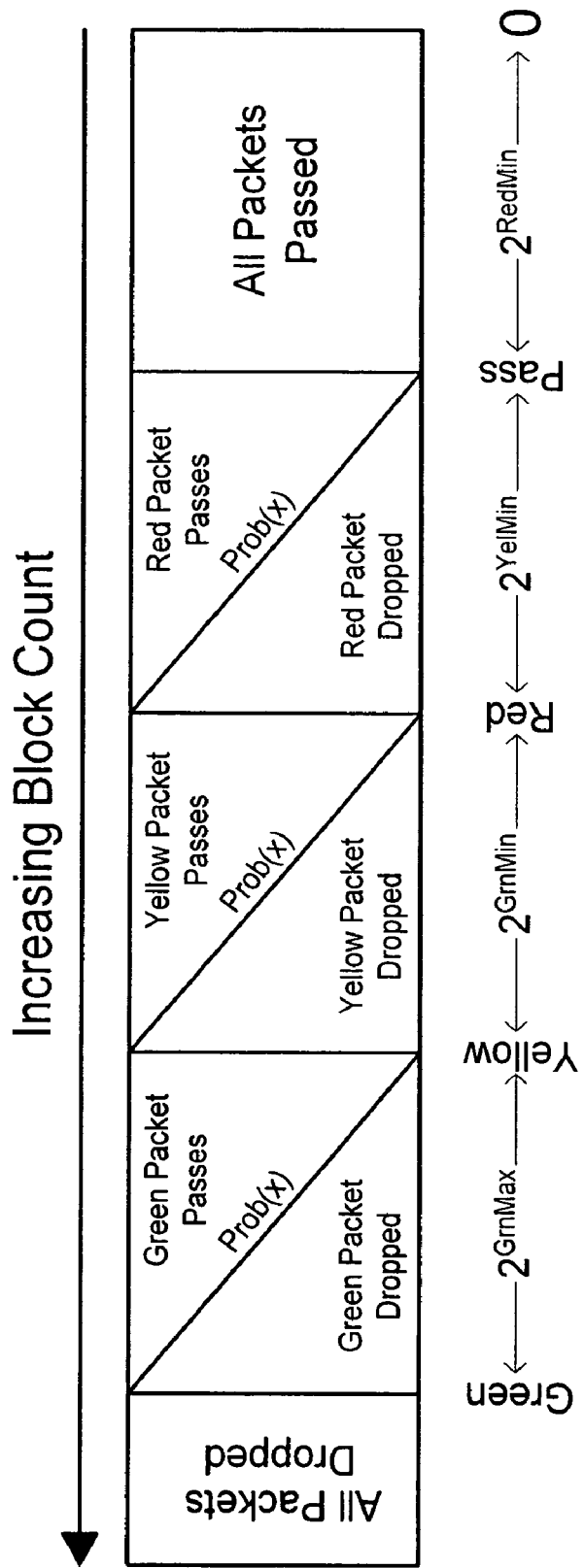
FIG. 13 is a diagram of a congestion algorithm according to one embodiment of the present invention.

FIG. 13 is a graphical representation of the RED algorithm. If a packet arrives when the byte count of the queue is between 0 and Pass, the packet is passed regardless of the color of the packet. If a packet arrives when the byte count is greater than Green, the packet is discarded regardless of the color of the packet. If a packet arrives when the byte count is between Pass and Green, the decision to discard or pass the packet depends on the color of the packet. For example, if a yellow packet arrives when the byte count is between Red and 0, the packet is passed. If a yellow packet arrives when the byte count is greater than Yellow, the packet is discarded. Lastly, if a yellow packet arrives when the byte count is between Red and Yellow, there is a linear probability if the packet is kept or discarded, for example, if the byte count is 75% of the way from Red to Yellow, there's a 75% chance that the packet will be discarded.

Figure 14:
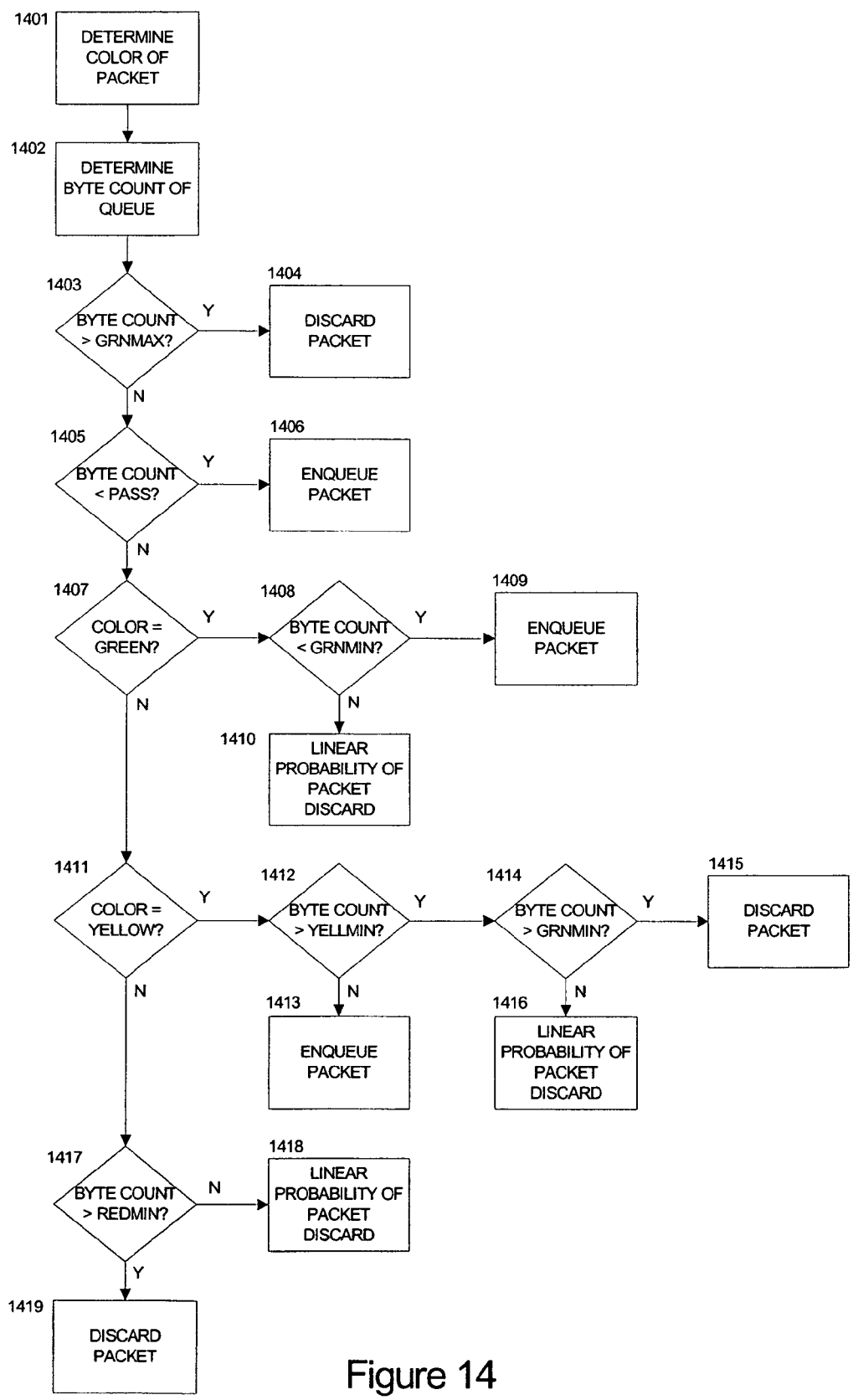
FIG. 14 is a process flowchart of an exemplary congestion management algorithm according to one embodiment of the invention.

FIG. 14 is a flowchart of an exemplary RED algorithm that can be utilized in conjunction with the present invention. When a packet arrives, for example at a group queue, the color of the packet is determined (1401), and the byte count of the group queue is determined (1402). The byte count of the queue is compared (1403) to GrnMax. If the byte count is greater than GrnMax, the packet is discarded (1404). However, if the byte count is not greater than GrnMax, the byte count is compared (1405) to Pass. If the byte count is less than Pass, the packet is enqueued (1406). On the other hand, if the byte count is not less than Pass, a determination is made (1407) whether the packet is "green." If the packet is "green," the byte count is compared (1408) to GrnMin. If the byte count is less than GrnMin, the packet is enqueued (1409). On the other hand, if the byte count is not less than GrnMin, the linear probability described above is applied (1410) to determine if the packet is enqueued or discarded.

At 1407, if the packet's color is determined not to be "green," a determination is made (1411) whether the color of the packet is "yellow." If the packet is "yellow," the byte count is compared (1412) to YelMin. If the byte count is less than YelMin, the packet is enqueued (1413). On the other hand, if the byte count is not less than YelMin, the byte count is compared (1414) to GrnMin. If the byte count is greater than GrnMin, the packet is discarded (1415). However, if the byte count is not greater than GrnMin, the linear probability described above is applied (1416) to determined if the packet is enqueued or discarded.

At 1411, if the packet's color is determined not to be "yellow," the byte count is compared (1417) to RedMin. If the byte count is not greater than RedMin, the linear probability described above is applied (1418) to determine if the packet is enqueued or discarded. On the other hand, if the byte count is greater than RedMin, the packet is discarded (1419).

In other embodiments, the above algorithm can be employed in conjunction with CIDs ("connection identifiers," which correspond to per flow queues on a line card), GIDs and VOs (virtual output queues) in a hierarchical manner. For example, each resource has its own set of thresholds and byte counts. The byte counts are summed across the resources. So, for instance, if there are 10 CIDs to the same GID each with a byte count of 100, then the GID byte count will be 100×10=1000 bytes. Similarly, if there are 3 GIDs to a VO (port+priority), then the VO byte count is the sum of the byte counts of all 3 GIDs corresponding to that VO. When a packet arrives at a resource, the total byte count for that resource is compared to the threshold of that resource that corresponds to the color of the packet. When a packet is accepted (i.e. not discarded) the byte counts of the associated CID, GID, and VO are incremented by the packet size at the same time. When the packet is transmitted the byte counts of the CID, GID, and VO are decremented by the packet size. This model is, for example, like a hierarchical RED model.

The thresholds for ingress are used to enforce the traffic contract and the final values are a combination of competing factors. One factor is the intended delay of the traffic class. The delay is longer for lower priority traffic classes to absorb bursting, and shorter for higher priority traffic classes to minimize delay. For example, for EF and the user control traffic (each has it's own CID) which are shaped at ingress user/access side interface, the delay is lower as compared to AF and BE traffic classes.

Another factor is a minimum value for the "pass" region (RedMin threshold) that allows a certain number of MTU's. This is to prevent prematurely discarding packets due to any internal delays or jitter within the hardware. Another factor is a fixed maximum value per traffic class to prevent allocating too large a threshold for a particular CID. An additional factor is a maximum burst size (MBS) calculation where appropriate for the service class and circuit type.

Once an overall "buffer size" (maximum byte count) has been calculated and the RedMin adjustment determined, the thresholds are divided up among the possible colors. If there are missing colors then those thresholds are zero (not used). The user control traffic class at the user/interface side for instance has only green packets so the YelMin and GrnMin values are zero.

For egress, the goals of congestion control preferably are (1) to isolate impact of one or few connections impacting non-congested queues, (2) to guarantee minimum rates—discard all red before green, (3) to minimize delay under congestion (especially for higher priorities), (4) to enforce traffic contracts, (5) to buffer reasonable bursts without discarding, and (6) to allow more buffering for lower priorities. The CID, GID, and VO thresholds combine to allow realization of these goals. Within a traffic class the CID, GID and VO have their separate RedMin, YelMin and GrnMin thresholds, though Green threshold is same for all the queues (CID, GID, VO). Each traffic class (e.g., EF, AF, BE) has it's own CID threshold, with lower thresholds for higher priority classes (like EF). The individual CID thresholds and GID, VO thresholds are adjusted such that BE and "out of contract" AF traffic is discarded before "in contract" AF, EF and user control traffic.

Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by any claims supportable by this application and the claims' equivalents rather than the foregoing description.

APPENDIX A

| ACRONYM LIST | |
|---|---|
| ACL | access control list |
| AF | assured forwarding traffic |
| ASIC | application specific integrated circuit |
| BE | best effort traffic |
| CID | connection identifier |
| CIR + EIR | committed information rate and excess information rate |
| DRR | deficit round robin |
| DSCP | Differentiated Service Code Point |
| EF | expedited forwarding traffic |
| EXP | experimental |
| FG | fabric gateway |
| GID | group identifier (group queue) |
| IP | internet protocol |
| LER | label edge router |
| LSP | label switched path |
| LSR | label switching router |
| MAC | media access control |
| MBS | maximum burst size |
| MPLS | multiprotocol label switching |
| MTU | maximum transmission unit |
| PLM | physical line module |
| PM | packet manager |
| PP | packet processor |
| PS | packet scheduler |
| QoS | quality of service |
| RED | random early discard |

APPENDIX A-continued

ACRONYM LIST

| | |
|---|---|
| SCC | switch and control card |
| SLA | service level agreement |
| ULC | universal line card |
| VO | virtual output queue |
| WRR | weighted round robin |

What is claimed is:

1. A method for offering differentiated service of network traffic, the method comprising:
   queuing the traffic into a first plurality of separate per flow queues;
   scheduling the traffic from the per flow queues into a group queue;
   performing congestion management on traffic in the group queue;
   scheduling traffic from the group queue into a second plurality of separate per flow queues based on priority; and
   scheduling traffic from the second plurality of separate per flow queues into either of a high priority group queue or a low priority group queue, wherein traffic in higher priority per flow queues of the second plurality of separate per flow queues is scheduled into the high priority group queue, and traffic in lower priority per flow queues of the second plurality of per flow queues is scheduled into the low priority group queue.

2. The method of claim 1, wherein traffic in the higher priority per flow queues of the second plurality of separate per flow queues is scheduled into the high priority group queue based on a round robin process, and traffic in the lower priority per flow queues of the second plurality of separate per flow queues is scheduled into the low priority group queue based on a round robin process.

3. The method of claim 1, further comprising:
   scheduling traffic from the high priority group queue in a strict priority over traffic in the low priority group queue.

4. A method for offering differentiated service of network traffic, the method comprising:
   queuing the traffic into a first plurality of separate per flow queues;
   scheduling the traffic from the first plurality of separate per flow queues into either of a high priority group queue or a low priority group queue, wherein traffic in higher priority per flow queues of the first plurality of separate per flow queues is scheduled into the high priority group queue, and traffic in lower priority per flow queues of the first plurality of separate per flow queues is scheduled into the low priority group queue;
   performing congestion management on traffic in the high priority group queue and traffic in the low priority group queue;
   scheduling traffic from the high priority group queue and the low priority group queue onto a second plurality of separate per flow queues based on priority; and
   scheduling traffic from the per flow queues of the second plurality of separate per flow queues onto either of a second high priority group queue or a second low priority group queue, wherein traffic in higher priority per flow queues of the second plurality of separate per flow queues is scheduled onto the second higher priority group queue, and traffic in lower priority per flow queues of the second plurality of separate per flow queues is scheduled onto the second low priority group queue.

5. The method of claim 4, wherein traffic in the higher priority per flow queues of the second plurality of separate per flow queues is scheduled onto the second high priority group queue based on a round robin process, and traffic in the lower priority per flow queues of the second plurality of separate per flow queues is scheduled onto the second low priority group queue based on a round robin process.

6. The method of claim 4, further comprising:
   scheduling traffic from the second high priority group queue in a strict priority over traffic in the second low priority group queue.

7. An apparatus for offering differentiated services of network traffic, the apparatus comprising:
   a per flow scheduler circuit configured to queue the traffic into a first plurality of separate per flow queues;
   a policer circuit configured to determine whether the traffic in the first plurality of separate per flow queues is within a predetermined limit;
   a higher priority scheduler circuit configured to schedule traffic in higher priority per flow queues of the first plurality of separate per flow queues into a group queue;
   a lower priority scheduler circuit configured to schedule traffic from lower priority per flow queues of the first plurality of separate per flow queues into the group queue; and
   a group queue congestion manager circuit configured to perform congestion management by
      determining whether a byte count of traffic in the group queue is within a predetermined range of byte counts, and
      if the byte count is determined to be within the predetermined range, forwarding or discarding traffic in the group queue based on at least one of (i) a result of the determining by the policer circuit and (ii) a priority value of the traffic in the group queue,
   wherein at least one of the per flow scheduler circuit, the policer circuit, the higher priority scheduler circuit, the lower priority scheduler circuit, and the group queue congestion manager circuit are included in a computer.

8. An apparatus for offering differentiated services of network traffic, the apparatus comprising:
   a per flow scheduler circuit configured to queue the traffic into a first plurality of separate per flow queues;
   a higher priority scheduler circuit configured to schedule traffic in higher priority per flow queues of the first plurality of separate per flow queues into a group queue;
   a lower priority scheduler circuit configured to schedule traffic from lower priority per flow queues of the first plurality of per flow queues into the group queue;
   a group queue congestion manager circuit configured to perform congestion management on traffic in the group queue;
   a second per flow scheduler circuit configured to schedule traffic from the group queue into a second plurality of separate per flow queues based on priority;
   a second higher priority scheduler circuit configured to schedule traffic from higher priority per flow queues of the second plurality of separate per flow queues into a high priority group queue; and
   a second lower priority scheduler circuit configured to schedule traffic from lower priority per flow queues of the second plurality of separate per flow queues into a low priority group queue,
   wherein at least one of the per flow scheduler, the higher priority scheduler, the lower priority scheduler, the group queue congestion manager, the second per flow scheduler, the second higher priority scheduler, and the second lower priority scheduler are included in a computer.

9. The apparatus of claim 8, wherein traffic in the higher priority per flow queues of the second plurality of separate per flow queues is scheduled into the high priority group queue based on a round robin process, and traffic in the lower priority per flow queues of the second plurality of separate per flow queues is scheduled into the low priority group queue based on a round robin process.

10. A non-transitory computer-readable storage medium having stored thereon computer-executable program instructions for offering differentiated services of network traffic, the computer-executable program instructions, when executed by a processor, cause the processor to perform a method comprising the steps of:

queuing the traffic in a first plurality of separate per flow queues;

scheduling the traffic from the per flow queues of the first plurality of separate per flow queues into a group queue; and performing congestion management on traffic in the group queue;

scheduling traffic from the group queue into a second plurality of separate per flow queues based on priority; and scheduling traffic from the second plurality of separate per flow queues into either of a high priority group queue or a low priority group queue, wherein traffic in higher priority per flow queues of the second plurality of separate per flow queues are scheduled into the high priority group queue, and traffic in lower priority per flow queues of the second plurality of per flow queues are scheduled into the low priority group queue.

11. The non-transitory computer-readable storage medium of claim 10, wherein traffic in the higher priority per flow queues of the second plurality of separate per flow queues is scheduled into the high priority group queue based on a round robin process, and traffic in the lower priority per flow queues of the second plurality of separate per flow queues is scheduled into the low priority group queue based on a round robin process.

12. An apparatus for offering differentiated services of network traffic, the apparatus comprising:

means for queueing the traffic into a first plurality of separate per flow queues;

means for determining whether the traffic in the first plurality of separate per flow queues is within a predetermined limit;

means for scheduling traffic in higher priority per flow queues of the first plurality of separate per flow queues into a group queue;

means for scheduling traffic from lower priority per flow queues of the first plurality of separate per flow queues into the group queue; and means for performing congestion management by
determining whether a byte count of traffic in the group queue is within a predetermined range of byte counts, and if the byte count is determined to be within the predetermined range, forwarding or discarding traffic in the group queue based on at least one of (i) a result obtained by the means for determining and (ii) a priority value of the traffic in the group queue.

13. An apparatus for offering differentiated services of network traffic, the apparatus comprising:

means for queueing the traffic into a first plurality of separate per flow queues;

means for scheduling traffic in higher priority per flow queues of the first plurality of separate per flow queues into a group queue;

means for scheduling traffic from lower priority per flow queues of the first plurality of per flow queues into the group queue;

means for performing congestion management on traffic in the group queue;

means for scheduling traffic from the group queue into a second plurality of separate per flow queues based on priority;

means for scheduling traffic from higher priority per flow queues of the second plurality of separate per flow queues into a high priority group queue; and means for scheduling traffic from lower priority per flow queues of the second plurality of separate per flow queues into a low priority group queue.

14. The apparatus of claim 13, wherein traffic in the higher priority per flow queues of the second plurality of separate per flow queues is scheduled into the high priority group queue based on a round robin process, and traffic in the lower priority per flow queues of the second plurality of separate per flow queues is scheduled into the low priority group queue based on a round robin process.

* * * * *

UNITED STATES PATENT AND TRADEMARK OFFICE
CERTIFICATE OF CORRECTION

Page 1 of 1

PATENT NO.         : 8,223,642 B2
APPLICATION NO.    : 11/413409
DATED              : July 17, 2012
INVENTOR(S)        : David S. Curry et al.

It is certified that error appears in the above-identified patent and that said Letters Patent is hereby corrected as shown below:

COLUMN 19:

Line 27, "are" should read --is--; and
Line 29, "are" should read --is--.

Signed and Sealed this
Second Day of October, 2012

David J. Kappos
*Director of the United States Patent and Trademark Office*